(12) United States Patent
Hattori et al.

(10) Patent No.: US 8,355,095 B2
(45) Date of Patent: Jan. 15, 2013

(54) BACKLIGHT UNIT

(75) Inventors: Norifumi Hattori, Aichi-ken (JP); Yasumasa Tatewaki, Aichi-ken (JP)

(73) Assignee: Toyoda Gosei Co., Ltd., Nishikasugai-Gun, Aichi-Ken (JP)

( * ) Notice: Subject to any disclaimer, the term of this patent is extended or adjusted under 35 U.S.C. 154(b) by 285 days.

(21) Appl. No.: 12/382,811

(22) Filed: Mar. 24, 2009

(65) Prior Publication Data

US 2009/0244432 A1 Oct. 1, 2009

(30) Foreign Application Priority Data

Mar. 28, 2008 (JP) ............................... P.2008-085661
Jan. 29, 2009 (JP) ............................... P.2009-018482

(51) Int. Cl.
*G02F 1/1335* (2006.01)
(52) U.S. Cl. .......................................................... 349/65
(58) Field of Classification Search .................. 349/141, 349/65
See application file for complete search history.

(56) References Cited

U.S. PATENT DOCUMENTS

| 6,175,396 | B1 * | 1/2001 | Kim et al. | 349/58 |
| 7,525,610 | B2 * | 4/2009 | Harayama et al. | 349/61 |
| 7,570,321 | B2 * | 8/2009 | Takahashi et al. | 349/65 |
| 7,639,315 | B2 * | 12/2009 | Kao | 349/58 |
| 7,710,514 | B2 * | 5/2010 | Choi | 349/65 |
| 2005/0099604 | A1 | 5/2005 | Mizumaki et al. | |
| 2006/0012731 | A1 * | 1/2006 | Ishiwa et al. | 349/65 |
| 2006/0176420 | A1 * | 8/2006 | Choi et al. | 349/62 |
| 2007/0121031 | A1 * | 5/2007 | Kitamura et al. | 349/65 |
| 2007/0242183 | A1 * | 10/2007 | Fukayama | 349/58 |
| 2007/0273807 | A1 * | 11/2007 | Yun | 349/58 |

FOREIGN PATENT DOCUMENTS

| JP | 2000-30519 A | 1/2000 |
| JP | 2003-346536 A | 12/2003 |
| JP | 2005-100692 A | 4/2005 |
| JP | 2005-158707 A | 6/2005 |
| JP | 2007-193238 A | 8/2007 |

OTHER PUBLICATIONS

Notification for Reasons for Refusal dated May 1, 2012 with English-language translation.

* cited by examiner

*Primary Examiner* — Timothy L Rude
(74) *Attorney, Agent, or Firm* — McGinn IP Law Group, PLLC

(57) ABSTRACT

To provide a backlight unit for use in a liquid crystal display device and so on, which is capable of overcoming a problem of interference due to expansion and contraction of a light guide plate and an optical sheet and preventing a strange noise by clicking, a backlight unit includes a support plate, a light guide plate that is disposed in the front side of the support plate and emits light, which is introduced from a light source through the end side of the light guide plate, through the front side of the light guide plate, an optical sheet that is disposed in the front side of the light guide plate, and a liquid crystal panel maintenance member that is disposed in the front side of the optical sheet, wherein the light guide plate and the liquid crystal panel maintenance member hold and fix the optical sheet at one point.

19 Claims, 35 Drawing Sheets

(a)

(b)

(c)

(a)

(b)

(c)

(a)

(b)

BACKLIGHT UNIT

BACKGROUND OF THE INVENTION

Field of the Invention

A backlight unit for liquid crystal display devices is generally divided into an edge light type and a direct lighting type. The edge light type is the mainstream for relatively small-sized liquid crystal display devices used for car navigators, mobile phones and so on. In a backlight unit of the edge light type, light introduced into a light guiding body via its end portion is emitted from the front side of the light guiding body, and a flux of light is adjusted by means of optical sheets to obtain desired surface light. Although a light guide plate or an optical sheet is fixed (maintained) to a support plate or a housing (hereinafter referred to as "support plate or the like"), a method of joining the optical sheet to the support plate or the like by means of screws or the like using through holes provided in the optical sheet (Patent Document 1), etc. has been employed as a method of fixing the optical sheet in conventional backlight units. In addition to this, there have been proposed a method of fixing a light guide plate and the like to the support plate or the like, a method of forming a concave portion of a predetermined shape in the support plate or the like, shaping the light guide plate and the like into a shape corresponding to the concave portion, and fitting and fixing the light guide plate and the like to the concave portion (Patent Document 2), etc.

Patent Document 1: JP-A-2003-346536
Patent Document 2: JP-A-2000-30519

Also, in relatively small-sized liquid crystal display devices used for car navigator systems and so on, large sizing has been in progress for the purpose of improvement of viewing convenience, increase of the amount of displayable information, expansion of usage or the like. When a liquid crystal display device becomes large in size, a light guide plate and an optical sheet required for a backlight unit used in the device becomes large accordingly. However, such a backlight unit using the large light guide plate and the optical sheet has a problem in that the backlight unit may be bent and deformed due to expansion and contraction of the light guide plate and the optical sheet when the backlight unit is used under environments having great variation of a temperature difference, such as in a vehicle. In other words, when the large light guide plate and the optical sheet are used, there arises a problem in that these members are expanded to interfere with each other or interfere with other adjacent members such as a support plate and the like, and, therefore, there is a need to take sufficient measures against such a problem. Here, in a liquid crystal display device used in a vehicle, a support plate and the like for measures against electromagnetic induction interference are required to be made of metal. However, when such a metal support plate and the like are used, the above-mentioned problem becomes more serious since a difference in coefficient of thermal expansion between a light guide plate or an optical sheet and the support plate. It may be contemplated that a clearance is made large in order to overcome the problem of interference between such members, however, when the clearance is made large, the members is likely to be clicked to make a strange noise. In particular, in a backlight unit used under vibratile environments, such as in a vehicle, such a strange noise due to clicking becomes conspicuous. More particularly, in a luxury car with good indoor and outdoor noise-proofing property, such a strange becomes undesirably even conspicuous.

In addition, when the clearance is made large, alien substances such as dusts are likely to penetrate into the clearance. The penetration of alien substances is undesirable since it has an effect on an optical characteristic of the backlight unit, which may result in generation of diffused light and deterioration of brightness.

SUMMARY OF THE INVENTION

In consideration of the above circumstances, it is an object of the present invention to overcome a problem of interference due to expansion and contraction of a light guide plate and an optical sheet and prevent a strange noise from being generated in a backlight unit. It is another object of the present invention to prevent alien substances such as dusts from penetrating into a backlight unit.

In order to achieve at least one of the above-mentioned objects, according to an aspect, the present invention provides a backlight unit including:

a support plate;

a light guide plate that is disposed in the front side of the support plate and emits light, which is introduced from a light source through the end side of the light guide plate, through the front side of the light guide plate;

an optical sheet that is disposed in the front side of the light guide plate; and a liquid crystal panel maintenance member that is disposed in the front side of the optical sheet, wherein the light guide plate and the liquid crystal panel maintenance member hold and fix the optical sheet at one point (first configuration).

With the first configuration, since the optical sheet is held and fixed at one point by the light guide plate and the liquid crystal panel maintenance member, position deviation of the optical sheet is prevented. In addition, since other portions of the optical sheet are free, the optical sheet is prevented from being bent by expansion/contraction due to temperature variation. In addition, a clearance can be minimized in consideration of expansion/contraction of the optical sheet and the like. As a result, clicking of the optical sheet is prevented and accordingly generation of a strange noise is avoided. In particularly, this is highly effective when the optical sheet is used under environments with great temperature variation and frequent vibration, such as in a vehicle.

A plurality of optical sheets may be stacked for the purpose of performing desired optical control. In this case, the optical sheets are stacked on the light guide plate such that they have substantially the same shape and are arranged at the substantial same position. In this state, the plurality of optical sheet is wholly held and fixed at one point by means of fixing means.

In a second configuration of the present invention, according to the first configuration, the liquid crystal panel maintenance member has a first projection that projects toward the light guide plate. The first projection is preferably integrally formed with the light guide plate although its shape is not particularly limited. This is because increase in the number of parts is prevented. Although the shape of the first projection is not particularly limited, it may have, for example, a semi-spherical shape, a conical shape, a triangular pyramidal shape or the like. For example, the first projection that projects toward the light guide plate may be formed by forming a concave portion by impressing a punch at a predetermined position of the liquid crystal panel maintenance member from the front side. Since the first projection can be provided with a simple stroke in this manner, this configuration may be easily applied to an existing configuration.

The height of the first projection may be appropriately set in consideration of thickness of the optical sheet, the number of optical sheets used, dimension tolerance and the like. For example, if three optical sheets having thickness of about 0.120 mm, the height of the first projection may be about 0.250 to about 0.400 mm, preferably about 0.275 to about 0.390 mm, most preferably about 0.385.

In a third configuration of the present invention, the first projection in the second configuration is formed in the center of an upper edge of the liquid crystal panel maintenance member. That is, the optical sheet is fixed to the center of an upper edge of the liquid crystal panel maintenance member. Thus, since variation of the horizontal direction due to expansion/contraction of the optical sheet becomes uniform in the left and right, an effect of position deviation due to the expansion/contraction is alleviated. In addition, since the amount of shift of a rotation direction of the optical sheet around a fixing portion by fixing the optical sheet to the center of the upper edge becomes small, the position deviation of the optical sheet is reduced as a whole.

In a fourth configuration of the present invention, according to the first to third configuration, the light guide plate has a second projection that projects toward the liquid crystal panel maintenance member. The optical sheet is held and fixed at the one point by the second projection and the liquid crystal panel maintenance member. The second projection is integrally formed with the light guide plate. Although the shape of the second projection is not particularly limited, it may have, for example, a semispherical shape, a conical shape, a triangular pyramidal shape or the like. The height of the second projection may be appropriately set similarly to the height of the first projection. In addition, when the backlight unit has the first projection and the second projection, it is preferable that the first projection is opposite to the second projection. This is because the optical sheet is reliably held and fixed at one point.

In a fifth configuration of the present invention, the second projection in the fourth configuration is formed in the center of an upper edge of the light guide plate. That is, the optical sheet is fixed to the center of the upper edge of the light guide plate. This shows the same effect as the third configuration.

In a sixth configuration of the present invention, according to the first configuration, a fixing member is provided between the light guide plate and the optical sheet or between the light guide body and the optical sheet, and the optical sheet is held and fixed by the light guide plate and the liquid crystal panel maintenance member via the fixing member. That is, the first or second projection integrally formed with the liquid crystal panel maintenance member or the light guide plate in the second to fifth configurations is separately formed as the fixing member in the sixth configuration. The shape of the fixing member is not particularly limited as long as it can fix the optical sheet at one point, but may have a semispherical shape, a spherical shape, a conical shape, a triangular pyramidal shape or the like. The height of the fixing member may be set similarly to the above-described first projection. The fixing member may have adhesion to the liquid crystal panel maintenance member or the light guide plate. For example, a double-sided tape having a predetermined thickness may be employed as the fixing member.

It may be configured that a cut-out portion is formed in a portion of the optical sheet, the light guide plate has a rib at a position corresponding to the cut-out portion, and a buffering material is provided between the rib and the liquid crystal panel maintenance member. With this configuration, a gap between the light guide plate and the liquid crystal panel maintenance member can be secured by the rib of the light guide plate. As a result, even when the light guide plate or the liquid crystal panel maintenance member is bent due to expansion/contraction, interference between the light guide plate and the liquid crystal panel maintenance member is alleviated, thereby preventing clicking and hence generation of a strange noise. It is preferable that the cut-out portion of the optical sheet and the rib of the light guide plate are provided at positions far away from a light incidence portion of the light guide plate. Leakage of incident light, generation of bright line, diffused light and the like in the cut-out portion of the optical sheet and the rib of the light guide plate are reduced. As a result, use efficiency of light is improved, which contributes to high brightness of the backlight.

The length of the rib provided in the light guide plate (length in the longitudinal direction of the light guide plate) may be about 0.4 to 0.9 times as long as the lower edge of the front of the light guide plate. When the rib is made long in the longitudinal direction in this manner, a contact area between the light guide plate and the liquid crystal panel maintenance member (via the buffering material) is extended for stabilization, thereby further preventing generation of a strange noise.

It is preferable that the buffering material is provided to contact the entire area of the front (that is, a face at the liquid crystal panel maintenance member side) of the rib of the light guide plate. This is because the light guide plate and the liquid crystal panel maintenance member are more stably fixed and maintenance of the optical sheet is increased.

As other configuration, according to one of the first to fifth configuration, the present invention provides a backlight unit including: a light guide plate including a first small projection formed in a left edge of a front upper end at the substantial same position in a vertical direction as a fixing point of the optical sheet (one point at which the optical sheet is fixed by the light guide plate and the liquid crystal panel maintenance member), a second small projection formed in a right edge of the front upper end at the substantial same position in the vertical direction as the fixing point of the optical sheet, and a third small projection formed in a lower end of the optical sheet at the substantial same position in a horizontal direction as the fixing point of the optical sheet; and an optical sheet including a first hole into which the first small projection is inserted, the first hole being formed at a position corresponding to the first small projection, a second hole into which the second small projection is inserted, the second hole being formed at a position corresponding to the second small projection, and a first cut-out portion into which the third small projection is inserted, the first cut-out portion being formed at a position corresponding to the third small projection, wherein the first hole and the second hole are long in the horizontal direction and the first cut-out portion is long in the vertical direction.

With the above configuration, the optical sheet is maintained in the light guide plate by inserting the small projections provided in the front side of the light guide plate into the first hole, the second hole and the first cut-out portion formed in the optical sheet. From the respect that the holes are affected by the expansion/contraction in the horizontal direction of the light guide plate and the optical sheet and the holes are formed at substantially the same position in the vertical direction as the fixation point of the optical sheet, by making the first and second holes at a position which is little affected by the expansion/contraction in the vertical direction long in the horizontal direction, it is possible to follow the position variation in the horizontal direction due to the expansion/contraction of the light guide plate and the optical sheet while preventing the positional deviation in the vertical direction. In addition, from the respect that the cut-out portion is greatly affected by the expansion/contraction in the vertical direction and the cut-out portion is formed at substantially the same position in the horizontal direction as the fixation point of the optical sheet, by making the first cut-out portion at a position which is little affected by the expansion/contraction in the horizontal direction long in the vertical direction, it is possible to follow the position variation in the vertical direction due to the expansion/contraction of the light guide and the optical sheet while preventing the positional deviation in the horizontal direction. Thus, when the positional relation between the light guide plate and the optical sheet is varied due to the expansion/contraction of the light guide plate and the optical sheet, the small projections are relatively moved into the first hole and the second hole in the horizontal direction, while the small projection is relatively moved into the first cut-out portion in the vertical direction. As a result of such movement of the small projections, no stress is applied to the optical sheet, thereby preventing the optical sheet from being bent or distorted. Thus, interference between the optical sheet and other adjacent member (particularly the light guide plate) is avoided.

In a seventh configuration of the present invention, the first projection in the second configuration is formed in the center of a lower edge of the liquid crystal panel maintenance member. That is, the optical sheet is fixed to the center of the lower edge of the liquid crystal panel maintenance member. Thus, since variation of the horizontal direction due to expansion/contraction of the optical sheet becomes uniform in the left and right, an effect of position deviation due to the expansion/contraction is alleviated. In addition, since the amount of shift of a rotation direction of the optical sheet around a fixing portion by fixing the optical sheet to the center of the lower edge becomes small, the position deviation of the optical sheet is reduced as a whole. In addition, when a light source is provided above the light guide plate, the fixing portion is positioned in a region far away from the light source. Thus, in the vicinity of the fixing portion, an effect of the expansion/contraction of the optical sheet and the light guide plate by heat from the light source is reduced, thereby further preventing position deviation of the optical sheet.

In an eighth configuration of the present invention, the second projection that projects toward the liquid crystal panel maintenance member in the fourth configuration is formed in the center of a lower edge of the light guide plate. That is, the optical sheet is held and fixed at the one point by the first projection of the liquid crystal panel maintenance member and the second projection of the light guide plate. The second projection is integrally formed with the light guide plate. Although the shape of the second projection is not particularly limited, it may have, for example, a semispherical shape, a conical shape, a triangular pyramidal shape or the like. The height of the second projection may be appropriately set similarly to the height of the first projection.

DESCRIPTION OF THE PREFERRED EMBODIMENTS

Figure 1:
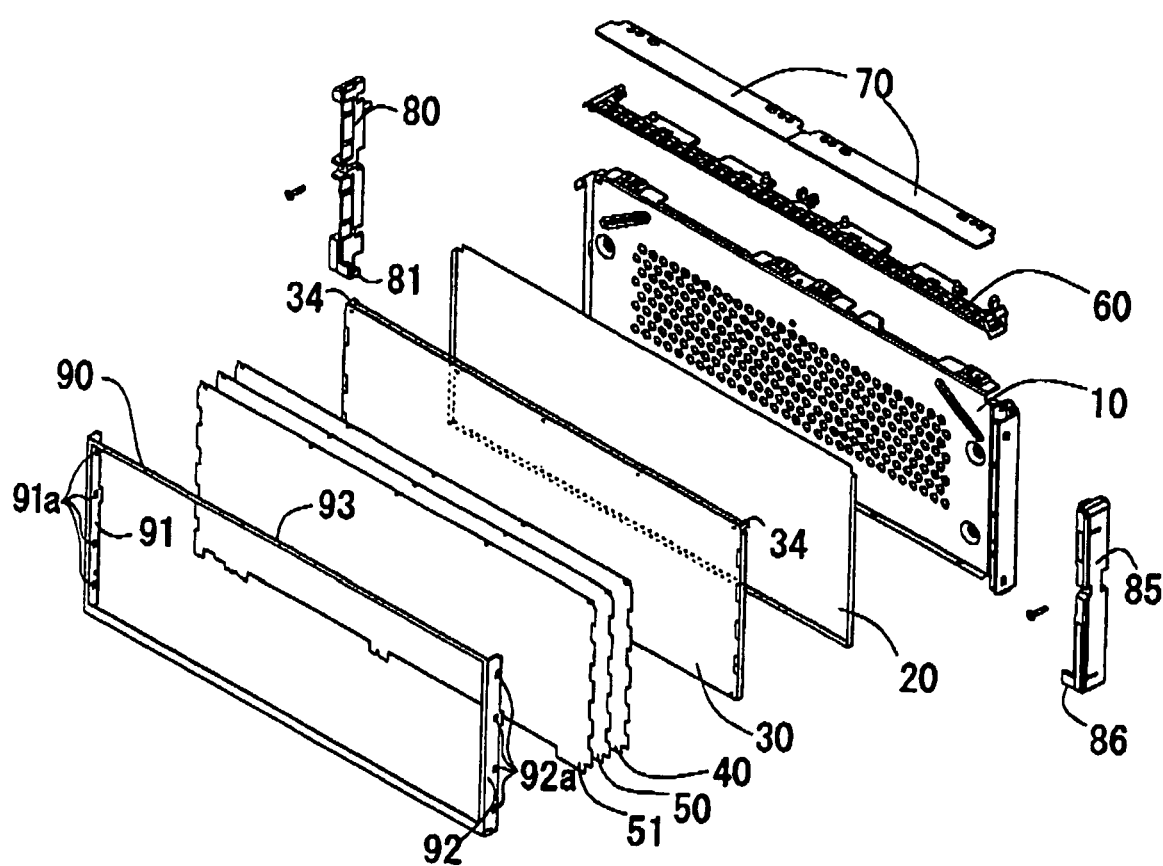
FIG. 1 is an exploded perspective view of a backlight unit 1 according to an embodiment of the present invention.

Hereinafter, the present invention will be described in detail with reference to the drawings. FIG. 1 is an exploded perspective view of a backlight unit 1 according to an embodiment of the present invention, FIGS. 2 to 7 are a front view, a rear view, a left side view, a right side view, a plan view and a bottom view of the backlight unit 1, respectively. The backlight unit 1 includes a shield case (support plate) 10, a reflecting sheet 20, a light guide (light guide plate) 30, a diffusing sheet 40, a vertical eye prism sheet 50, a horizontal eye prism sheet 51, an upper holder (holding member) 60, a print board assy 70, a left holder 80, a right holder 85, and a TFT holder (liquid crystal panel holding member) 90. In the backlight unit 1, the reflecting sheet 20, the light guide 30, the diffusing sheet 40, the vertical eye prism sheet 50 and the horizontal eye prism sheet 51 are stacked in the front side of the shield case 10 in order, as shown in this figure. In addition, the upper holder 60 and the print board assy 70 are mounted on the top side of the shield case 10.

Figure 8:
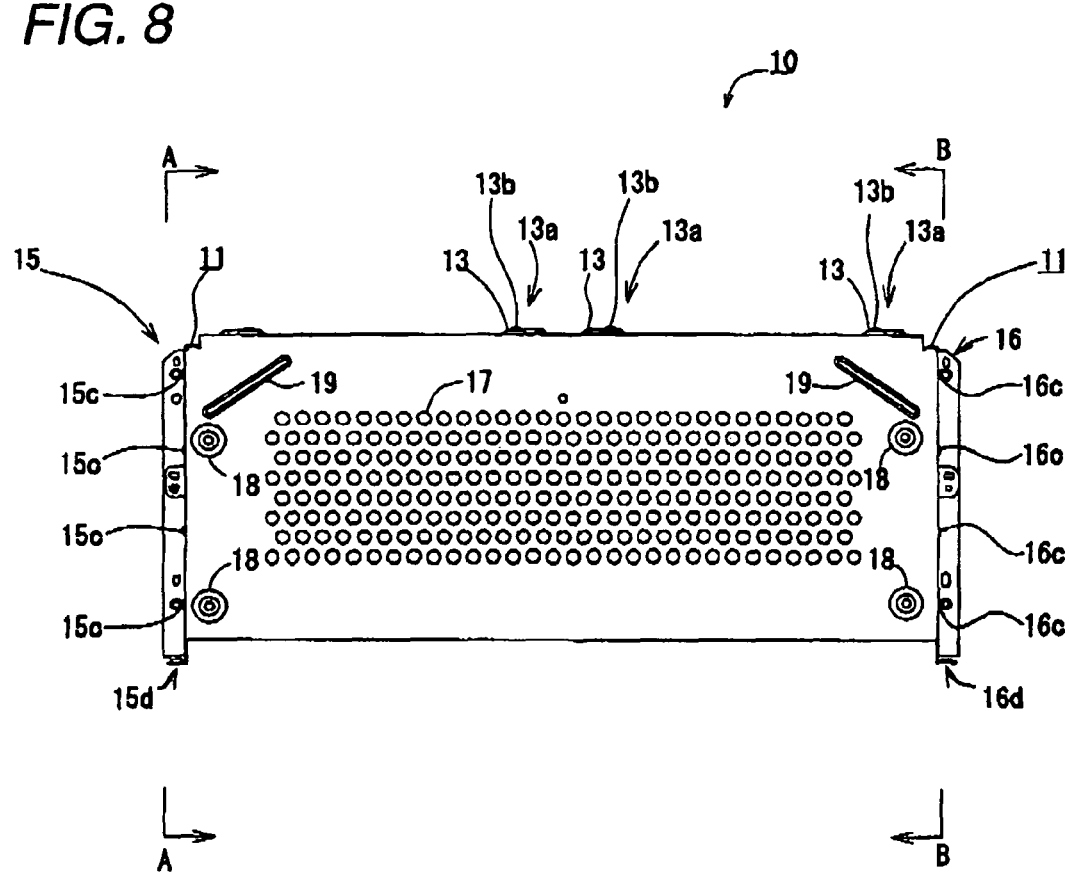
FIG. 8 is a front view of a shield case 10.
Figure 9:
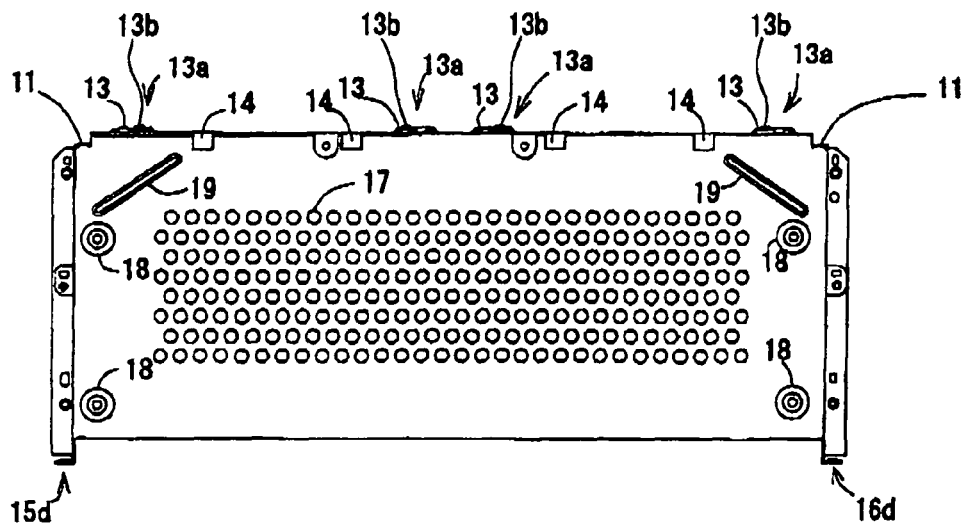
FIG. 9 is a rear view of the shield case 10.
Figure 10:
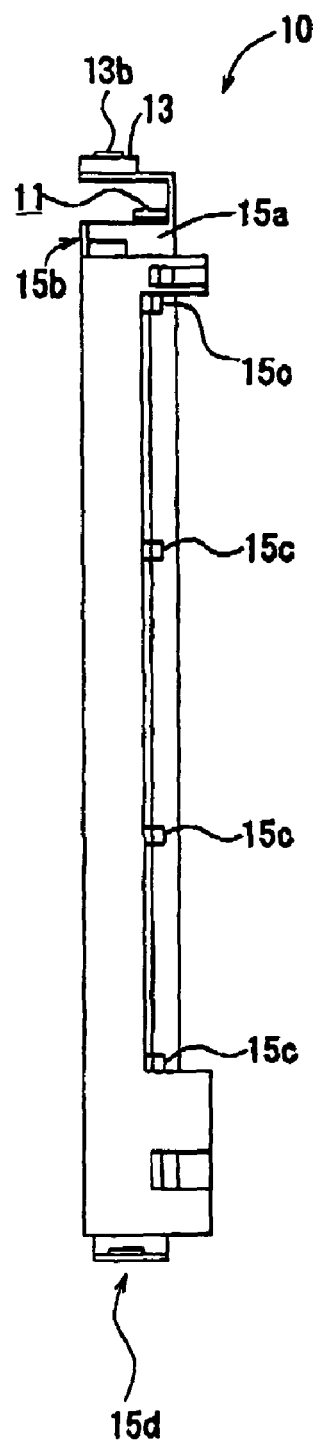
FIG. 10 is a left side view of the shield case 10.
Figure 11:
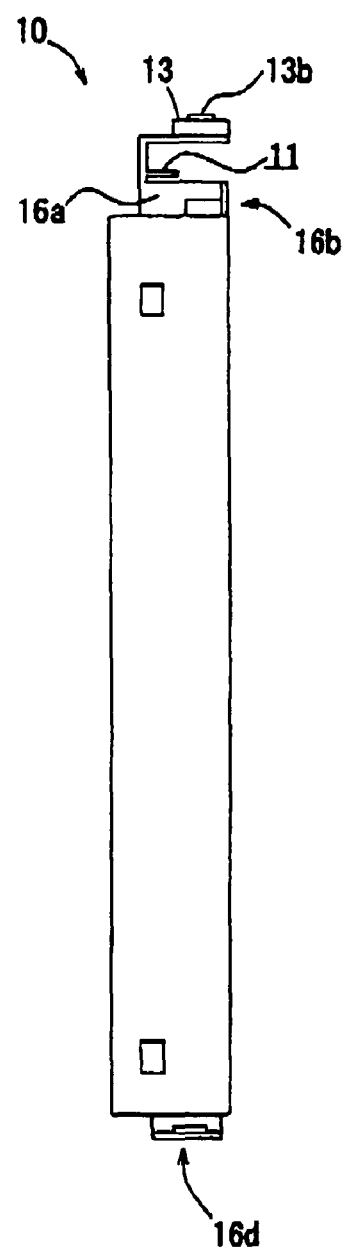
FIG. 11 is a right side view of the shield case 10.
Figure 12:
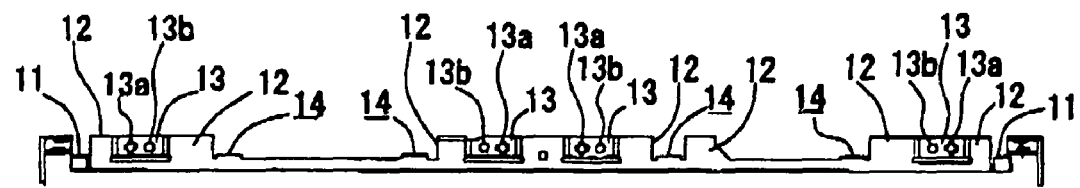
FIG. 12 is a plan view of the shield case 10.
Figure 13:
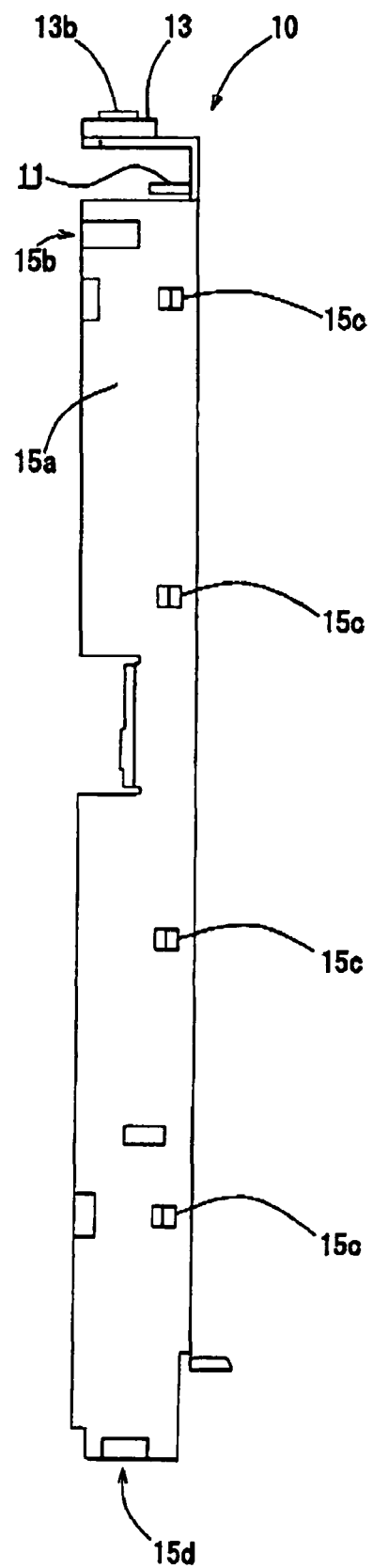
FIG. 13 is a sectional view taken along line A-A in FIG. 8.
Figure 14:
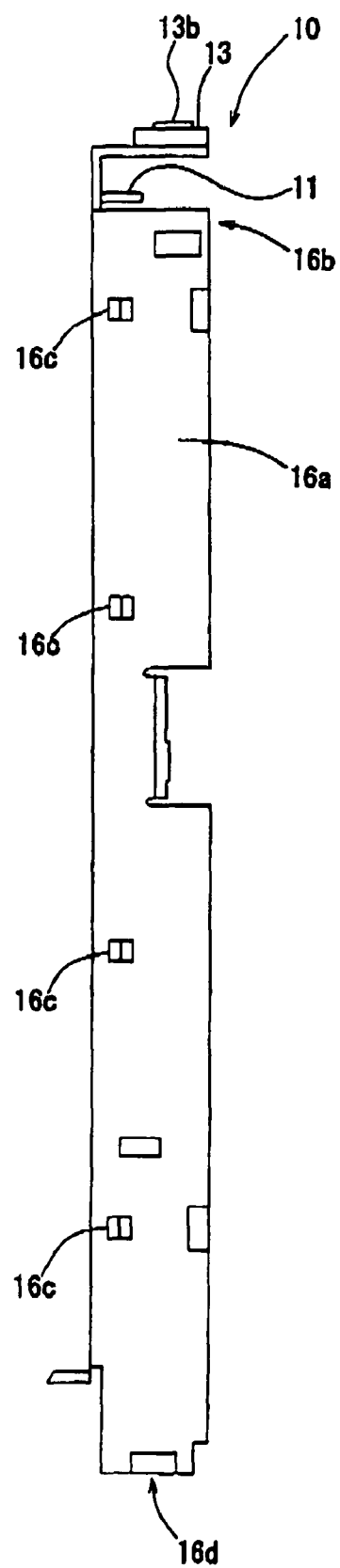
FIG. 14 is a sectional view taken along line B-B in FIG. 8.

First, a configuration of the shield case 10 will be described with reference to FIGS. 1 and 8 to 14. FIGS. 8 to 12 are a front view, a rear view, a left side view, a right side view and a plan view of the shield case 10, respectively. FIG. 13 is a sectional view taken along line A-A in FIG. 8 and FIG. 14 is a sectional view taken along line B-B in FIG. 8.

The shield case 10 is a surface-treated steel sheet (SECC) having a rectangular shape (about 100 mm in height and about 300 mm in width) when viewed from top. The shield case 10 functions as not only a supporting member for the light guide 30, which will be described later, but also a shield against an electromagnetic induction.

A rib receiving seat 11 composed of a plane bent to a rear side is provided at left and right edges of the upper end of the shield case 10. An upper end inside the rib receiving seat 11 is bent to the rear side at a position higher by one step than the rib receiving seat 11 and forms a seat face 12 for the upper holder and a seat face 13 for the print board assy, which is higher by one step than the seat face 12. In the seat face 13 for the print board assy are formed screw holes 13*a* and projections 13*b* used for positioning and holding the print board assy 70. At the rear side of the upper end of the shield case 10 are arranged four tongue pieces 14 at predetermined intervals, which extend vertically downward. The tongue pieces 14 are used for maintenance of the upper holder 60.

Each of the left and right edges of the shield case 10 is bent into a U-like shape by which a receiving portion 15 of the left holder 80 and a receiving portion 16 of the right holder 85 are formed. In an inner face 15*a* of opposing faces constituting the left holder receiving portion 15 are formed one hole 15*b* for upper holder fixation and four engaging claws 15*c* for TFT holder fixation. In addition, the lower end of the face 15*a* is outwardly curved into an L-like shape and a screw hole 15*d* for TFT holder fixation is formed in the bent portion. Similarly, the right holder receiving portion 16 has a hole 16*b* for upper holder fixation, engaging claws 16*c* for TFT holder fixation, and a screw hole 16*d* for TFT holder fixation.

Reference numerals 17, 18 and 19 denote hole formed for heat radiation and light weight, screw holes for backlight unit fixation, and ribs for reinforcement, respectively.

The reflecting sheet 20 is a rectangular resin sheet made of white polyester when viewed from top and reflects light leaked from the rear side of the light guide 30 in a front direction. This improves use efficiency of the light. In addition, brightness spots of light emitted from the light guide 30 are lessened by a diffusion action by the reflecting sheet 20. Instead of the reflecting sheet 20, the same effect can be attained by subjecting the rear side of the light guide 30 to reflective treatment.

Figure 15:
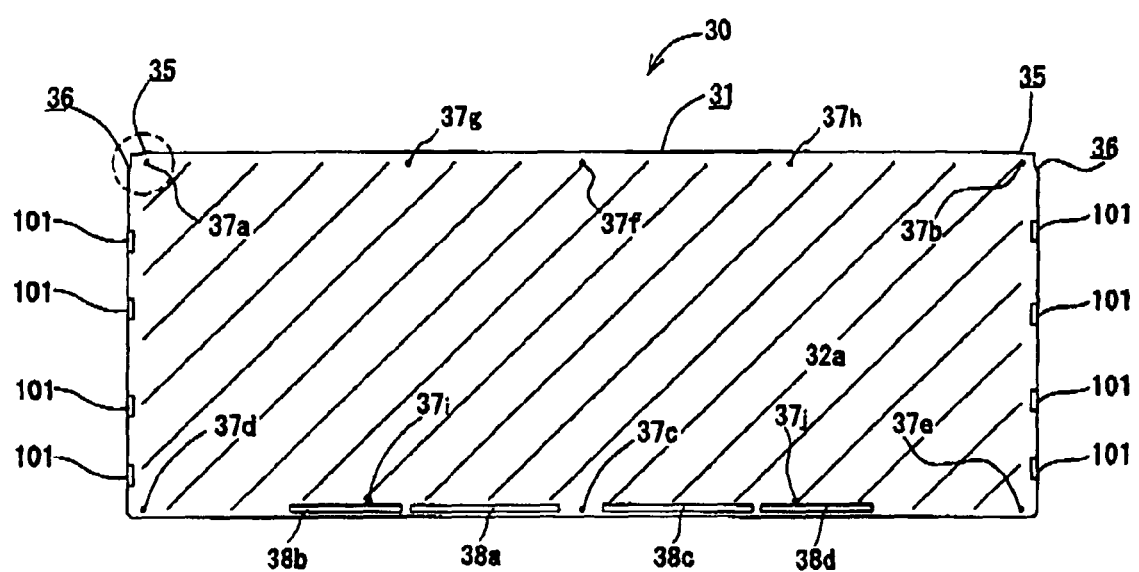
FIG. 15 is a front view of a light guide 30.
Figure 16:
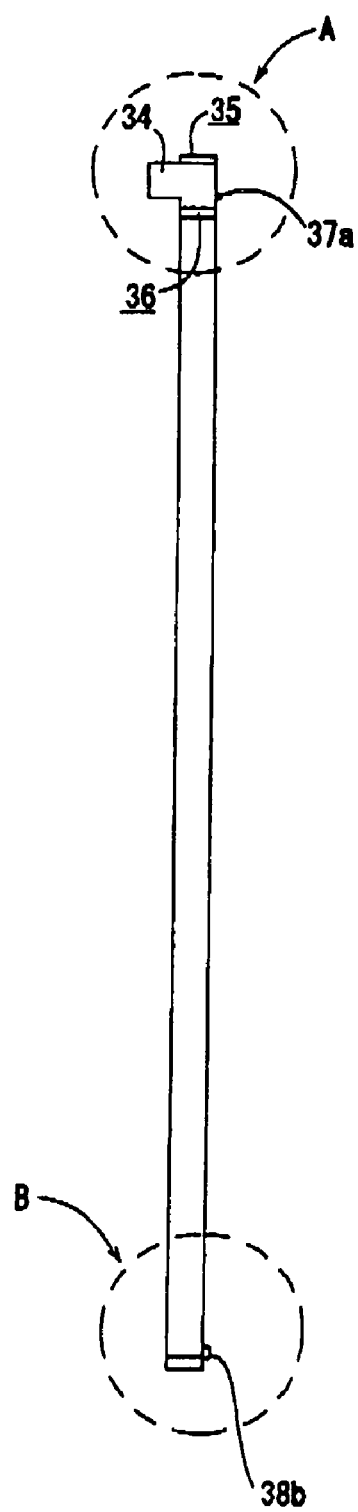
FIG. 16 is a left side view of the light guide 30.
Figure 17:
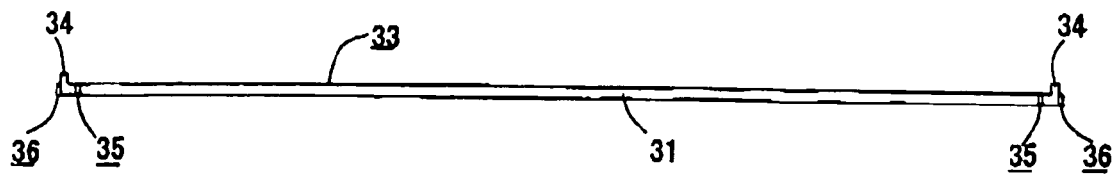
FIG. 17 is a top view of the light guide 30.
Figure 18:
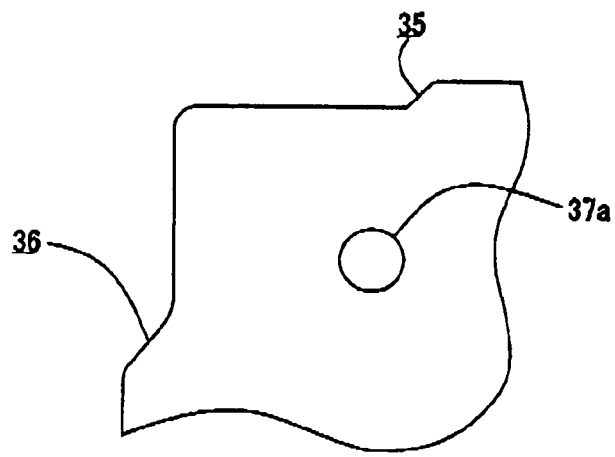
FIG. 18 is an enlarged view of a portion A in FIG. 15.
Figure 19:
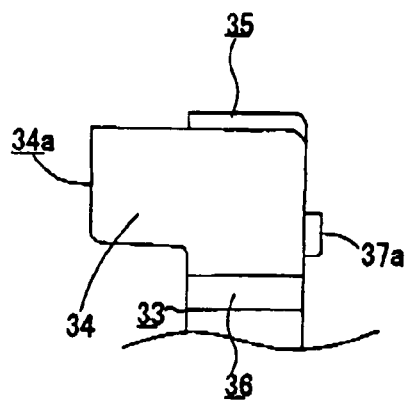
FIG. 19 is an enlarged view of a portion A in FIG. 16.
Figure 20:
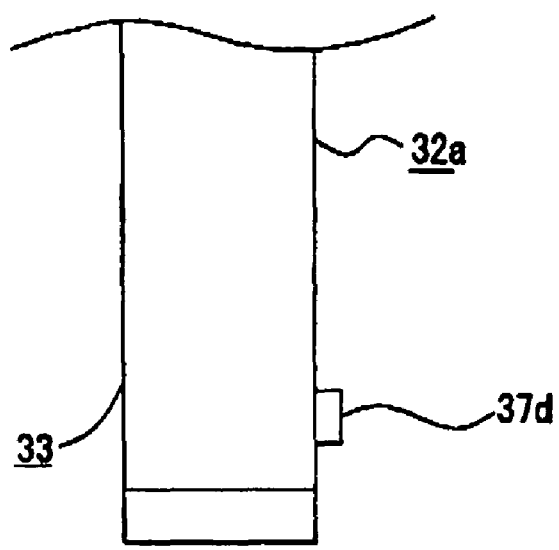
FIG. 20 is an enlarged view of a portion B in FIG. 16.

Next, a configuration of the light guide 30 will be described in detail with reference to FIGS. 1 and 15 to 17. FIGS. 15 to 17 are a front view, a left side view and a top view of the light guide 30, respectively. FIG. 18 is an enlarged view of a portion A in FIG. 15 and FIGS. 19 and 20 are enlarged views of portions A and B in FIG. 16. The light guide 30 is a rectangular light guide plate when viewed from top and its material is polymethylmetacrylate (PMMA). The light guide 30 may be made of a material such as polyethylene terephthalate (PET), polycarbonate resin, epoxy resin, glass or the like.

In the light guide 30, a region except the left and right edges of the upper end becomes a light incidence region 31 and a region except an edge of the front side 32 becomes a light emission region 32*a*. Maintenance projections (maintenance ribs 34) projecting toward the rear side are formed in the left and right edges of the upper end of the light guide 30. Each of the maintenance ribs 34 has a substantially square pillar shape and its height (distance from the rear side 33 to a leading end 34*a* of the maintenance rib 34) is about 3 mm. The thickness of other portion of the light guide 30 except the portion having the maintenance rib 34 is constant (about 3.0 mm)

Figure 21:
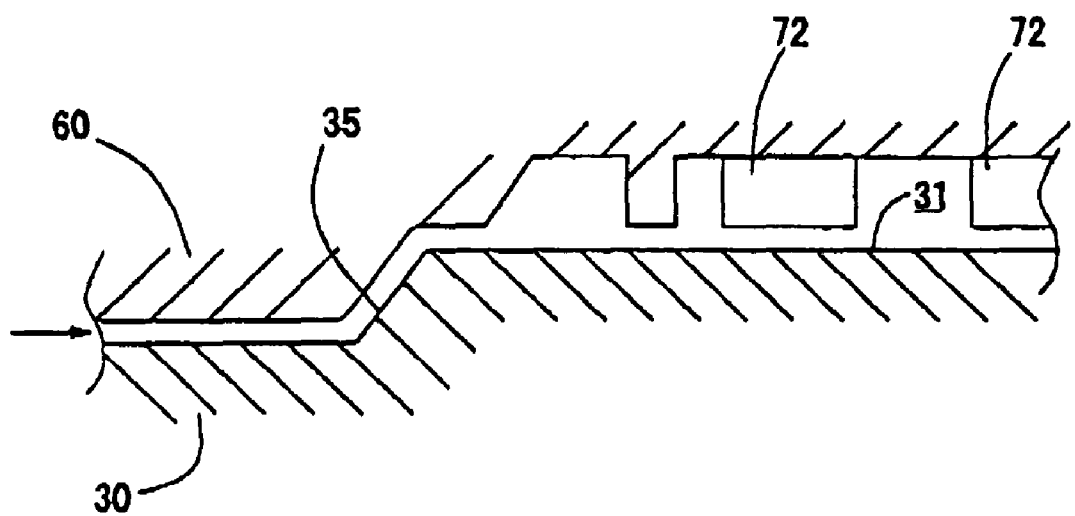
FIG. 21 is a view showing a state after assembly of the backlight unit 1.

A formation region of the maintenance rib 34 (i.e., the left and right edges of the upper end of the light guide 30) is shaped with its portion cut out. This produces a pair of left and right upper end step faces 35. The upper end step faces 35 function as a barrier to dusts. That is, as can be seen from FIG. 21 showing a state after assembly of the backlight unit 1, the upper end step faces 35 prevent dusts from penetrating into the light incidence region 31. This prevents quality deterioration such as generation of diffused light, brightness deterioration and the like. In this manner, by proving the upper end step faces 35, a structure robust to dusts can be attained. In addition, a side end step face 36*a* is used as a receiving seat of the upper holder 60. In the front side of the light guide 30, four rib-shaped small projections 101 are formed at equal intervals along the left and right edges. Cut-out portions 106 are formed to correspond to the rib-shaped small projections 101 in each of the optical sheets 40, 50 and 51 which will be described later.

The light guide 30 has 10 pins (small projections). Arrangement of each pin is as follows. As shown in FIG. 15, in the upper end of the front side 32, pins (small projections) are respectively formed at positions of left and right edges (first pin 37*a* and second pin 37*b*), the center (sixth pin 37*f*), a middle between the first pin 37*a* and the sixth pin 37*f* (seventh pin 37*g*) and a middle between the second pin 37*b* and the sixth pin 37*f* (eighth pin 37*h*). On the other hand, in the lower end of the front side 32 of the light guide 30, pins are respectively formed at positions of left and right edges (fourth pin 37*d* and fifth pin 37*e*), the center (third pin 37*c*), a middle between the fourth pin 37*d* and the third pin 37*c* (ninth pin 37*i*) and a middle between the fifth pin 37*e* and the third pin 37c (tenth pin 37j). In this embodiment, a distance between the pins (the first pin 37a, the second pin 37b, the sixth pin 37f, the seventh pin 37g and the eighth pin 37h) formed on the upper end and the top portion is about 3.7 mm, and a distance between the pins (the fourth pin 37d, the fifth pin 37e and the third pin 37c) formed on the lower end and the bottom portion is about 0.5 mm. These pins show functions such as positioning and maintenance of the optical sheets, prevention of bend of the optical sheets and so on in cooperation with the holes and cut-out portions formed in the optical sheets (the diffusing sheet 40, the vertical eye prism sheet 50 and the horizontal eye prism sheet 51). All of the pins 37a to 37j have a cylindrical shape having height of about 0.7 mm and their diameter is as follows. That is, the pins 37a to 37c have a diameter of about 1.2 mm, the pins 37d and 37e have a diameter of about 2.0 mm, the pins 37f to 37h have a diameter of about 1.0 mm, and the pins 37i and 37j have a diameter of about 1.5 mm. The shape of the pins 37a to 37j is not limited to this example but may be a shape which can be easily inserted in the holes formed in the optical sheets to be described later and which does not apply an excessive load (which is likely to deform the holes) to the optical sheets during and after the insertion, such as an elliptic cylindrical shape or the like, instead of the cylindrical shape.

The size of the pin 37a to 37j is not particularly limited. The diameter of the pin 37a to 37j is, for example, 0.5 mm to 3.0 mm and their height is, for example, 0.3 mm to 1.0 mm.

In addition, the formation position of the pin 37a to 37j may be set at random under conditions that the above functions can be shown and the formation position has no effect on an emission characteristic of the backlight unit 1. However, as in this embodiment, it is preferable to form the first pin 37a and the second pin 37b with the symmetrical relation. This is similarly applied to the fourth pin 37d and the fifth pin 37e, the seventh pin 37g and the eighth pin 37h, and the ninth pin 37i and the tenth pin 37j.

Ribs 38a to 38d are formed in the lower end of the light guide 30. The ribs 38a to 38d are about 1.0 mm in width and about 45 mm in length. The rib 38a is formed at a position distant by about 0.3 mm from the bottom side of the light guide 30 in parallel to the bottom side, and one step (end at a center side) is formed with a gap of about 7 mm from the center of the bottom side. Also, the rib 38b is formed at a position distant by about 0.3 mm from the bottom side of the light guide 30 in parallel to the bottom side, and is arranged with a gap of about 3 mm from the rib 38a. The ribs 38c and 38d are arranged in bilateral symmetry with the ribs 38a and 38b, respectively. Thus, the ribs 38a to 38d are formed into a linear shape along the bottom side of the light guide 30.

In addition, a micro lens pattern is formed in the rear side (a side in the opposite to 32a) of the light guide. The micro lens pattern has a dot matrix shape in which micro lenses, which are about 150 μm in diameter and about 50 μm in height, are arranged with a pitch of about 200 μm.

Figure 22:
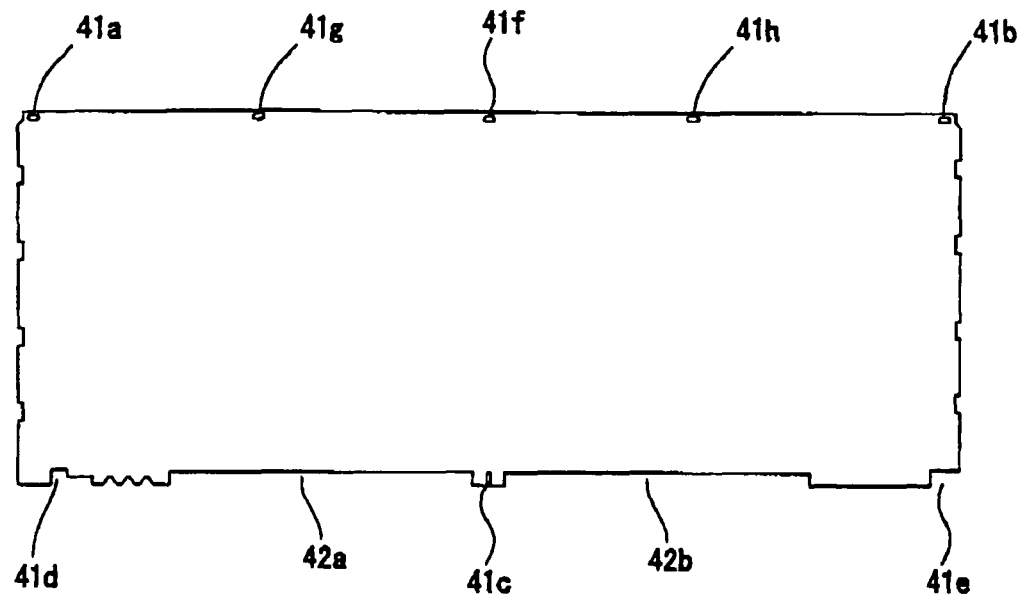
FIG. 22 is a plan view of a diffusing sheet 40.
Figure 23:
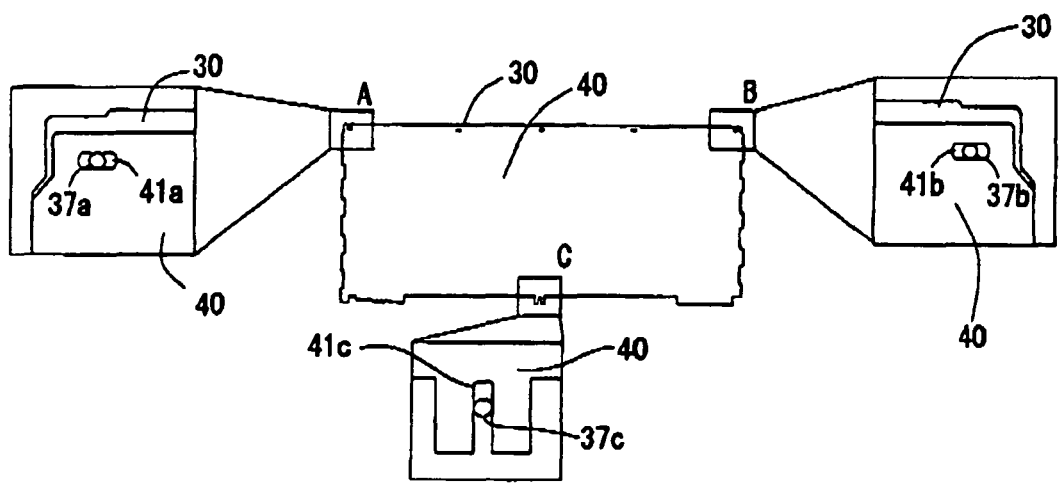
FIG. 23 is a plan view and a partially enlarged view showing a state where the diffusing sheet 40 is maintained in the light guide 30.

The diffusing sheet 40 stacked in the front side of the light guide 30 is a polyethyleneterephthalate (PET) sheet containing a diffusion material. The vertical eye prism sheet 50 is a sheet having an acryl layer (prism layer) formed on a base made of polyester resin. The horizontal eye prism sheet 51 has the same configuration. These 3 sheets have holes or cut-out portions formed at positions corresponding to the pin 37a to 37j and the ribs 38a to 38d in the same aspect. In addition, cut-out portions 106 are formed in the optical sheets 40, 50 and 51 to correspond to the rib-shaped small projections 101 of the light guide 30. Hereinafter, a detailed configuration of the holes will be described by way of an example of the diffusing sheet 40 with reference to FIGS. 22 and 23. FIG. 22 is a plan view of the diffusing sheet 40, and FIG. 23 is a plan view and a partially-enlarged view showing a state where the diffusing sheet 40 is maintained in the light guide 30.

As shown in FIG. 22, five holes 41a, 41g, 41f, 41h and 41b are formed in the upper end of the diffusing sheet 40 in order from the left side of the paper and five cut-out portions 41d, 42a, 41c, 42b and 41e are formed in the lower end in order from the left side of the paper. All of the holes 41a, 41g, 41f, 41h and 41b in the upper end have 3 functions, that is, positioning and maintenance of the diffusing sheet 40 with respect to the light guide 30, tracking to positional change of a horizontal direction in company with expansion and contraction of the light guide 30 and the diffusing sheet 40 (adjustment of position of the horizontal direction), and prevention of positional deviation of a vertical direction. All of the holes 41a, 41g, 41f, 41h and 41b are made to be long in the horizontal direction in order to show these functions (see the partially enlarged view of portions A and B in FIG. 23). Specifically, the diameter of the holes is about 1.5 mm in the vertical direction and about 3.0 mm in the horizontal direction.

A cut-out portion at a center position of the lower end (the first cut-out portion 41c) has 3 functions, that is, positioning and maintenance of the diffusing sheet 40 with respect to the light guide 30, tracking to positional change of a vertical direction in company with expansion and contraction of the light guide 30 and the diffusing sheet 40 (adjustment of position of the vertical direction), and prevention of positional deviation of a horizontal direction. The first cut-out portion 41c is made to be long in the vertical direction in order to show these functions (see the enlarged view of a portion C in FIG. 23). Specifically, the cut-out portion has a shape which is about 1.5 mm in the horizontal direction (width) and is dug by about 4.5 mm from the bottom side in the vertical direction.

Cut-out portions formed in the left and right edges of the lower end (the second cut-out portion 41d and the third cut-out portion 41e) are used for support of the diffusing sheet 40. That is, the provision of these cut-out portions ensure that the left and right edges of the lower end of the diffusing sheet 40 is arranged at a desired position when the diffusing sheet 40 is placed on the light guide. In addition, when the light guide 30 and the diffusing sheet 40 are expanded/contracted, it is possible to prevent the left and right edges of the lower end of the diffusing sheet 40 from interfering with other adjacent members. In addition, the cut-out portions have a rectangular shape which is about 5.0 mm in width and about 4.5 mm in height so as to track to positional change of a horizontal direction and a vertical direction in company with the expansion and contraction of the light guide 30 and the diffusing sheet 40.

The fourth cut-out portion 42a is provided between the first cut-out portion 41c and the second cut-out portion 41d. The fourth cut-out portion 42a is a rectangular long dug groove which is about 100 mm in width and about 4.5 mm in height. The fifth cut-out portion 42b is formed in bilateral symmetry with the same shape as the fourth cut-out portion 42a.

As shown in FIG. 23, by inserting the corresponding pins 37a, 37g, 37f, 37h, 37b and 37c into the above holes 41a, 41g, 41f, 41h and 41b and the first cut-out portion 41c, the diffusing sheet 40 is positioned and maintained on the light guide 30. It can be seen that the holes 41a, 41g, 41f, 41h and 41b are positioned such that the corresponding pins are positioned at the substantial middle. In addition, as shown in FIG. 23, the ribs 38a to 38d of the lower end of the light guide 30 are positioned at the second cut-out portion 42a and the third cut-out portion 42b. That is, the second cut-out portion 42a and the third cut-out portion 42b function as a region from which the ribs 38a to 38d exit, thereby preventing the diffusing sheet 40 from interfering with the ribs 38a to 38d unnecessarily.

The size of the holes 41a, 41g, 41f, 41h and 41b and the cut-out portions 41c, 42a and 42b is set in consideration of the size of the pins 37a, 37g, 37f, 37h, 37b and 37c, thermal coefficients of the light guide 30 and the diffusing sheet 40 of the ribs 38a to 38d, etc., and is shown as only an example in this embodiment. As an example of the size of the holes and cut-out portions, the holes 41a, 41g, 41f, 41h and 41b have a size to secure a clearance of, for example, 0 mm to 0.45 mm, preferably 0 mm to 0.2 mm in the vertical direction and a clearance of, for example, 0.4 mm to 1.03 mm, preferably 0.8 mm to 1.03 mm in the horizontal direction when the pins are inserted. The first cut-out portion 41c has a size to secure a clearance of, for example, 0.28 mm to 1.08 mm, preferably 0.85 mm to 1.08 mm in the vertical direction and a clearance of, for example, 0 mm to 0.45 mm, preferably 0 mm to 0.2 mm in the horizontal direction when the pins are inserted. The second cut-out portion 42a has a size to secure a clearance of, for example, 1.0 mm to 5.0 mm, preferably 0.5 mm to 1.5 mm in the upper side of the ribs 38a and 38b and a clearance of, for example, 1.0 mm to 5.0 mm, preferably 0.5 mm to 1.5 mm in the horizontal direction.

The number and formation position of the holes depend on the number and formation position of the pins formed in the light guide, but those shown in FIGS. 22 and 23 are shown as only an example. For example, one or more holes (holes for positioning and maintenance, tracking to positional change of a horizontal direction, and prevention of positional deviation of a vertical direction) showing the same functions as the above-mentioned holes may be provided between the hole 41a and the hole 41g, between the hole 41g and the hole 41f, between the hole 41f and the hole 41h, and between the hole 41h and the hole 41b, respectively.

Figure 24:
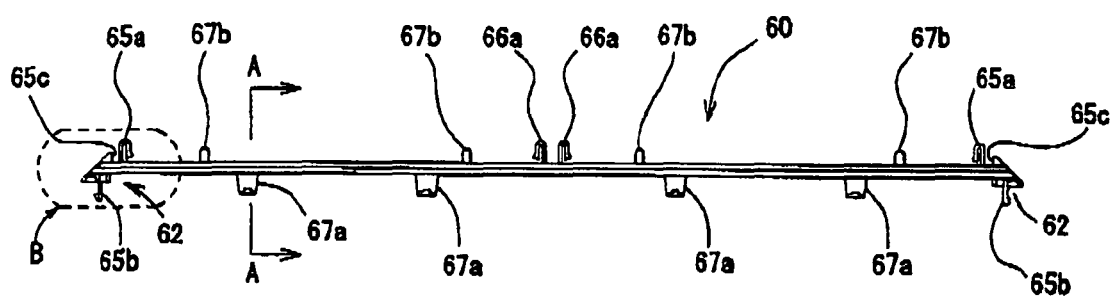
FIG. 24 is a front view of an upper holder 60.
Figure 25:
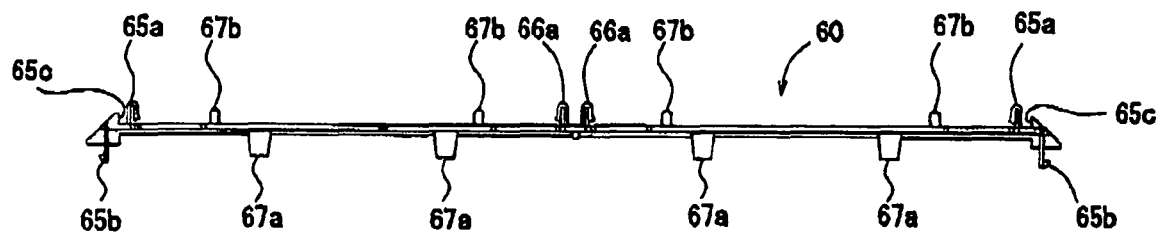
FIG. 25 is a rear view of the upper holder 60.
Figure 26:
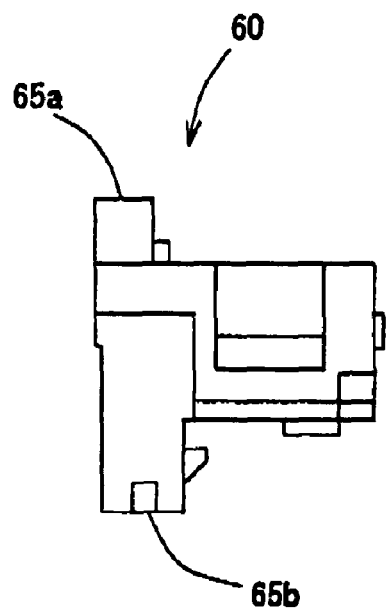
FIG. 26 is a left side view of the upper holder 60.
Figure 27:
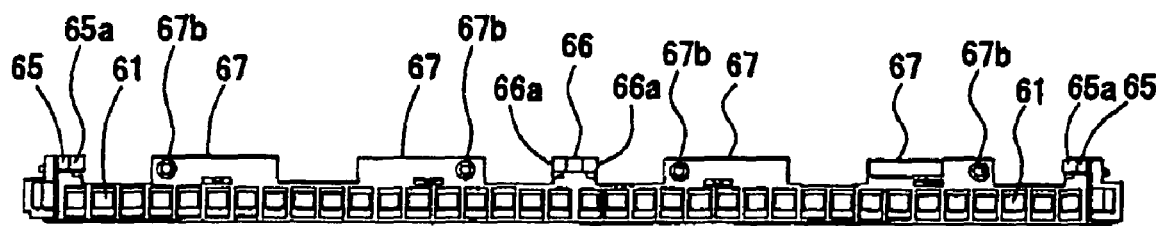
FIG. 27 is a plan view of the upper holder 60.
Figure 28:
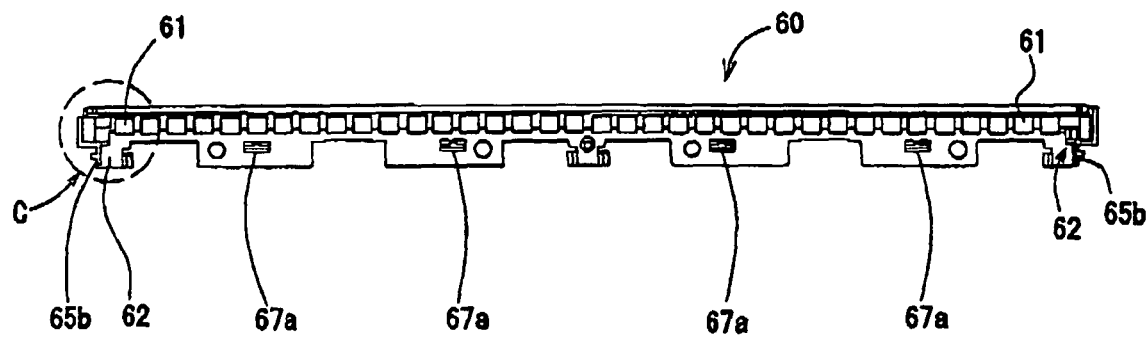
FIG. 28 is a bottom view of the upper holder 60.
Figure 29:
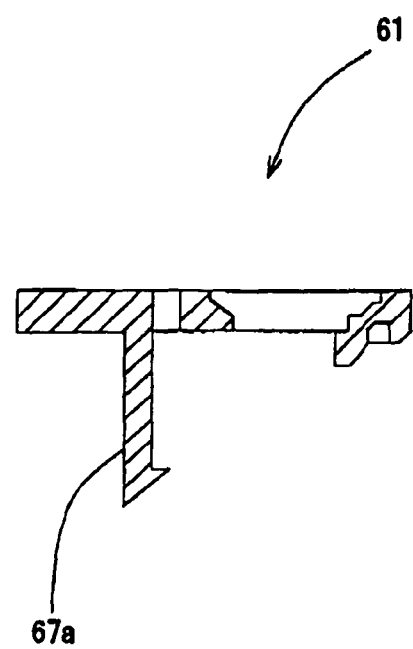
FIG. 29 is a sectional view taken along line A-A in FIG. 24.
Figure 30:
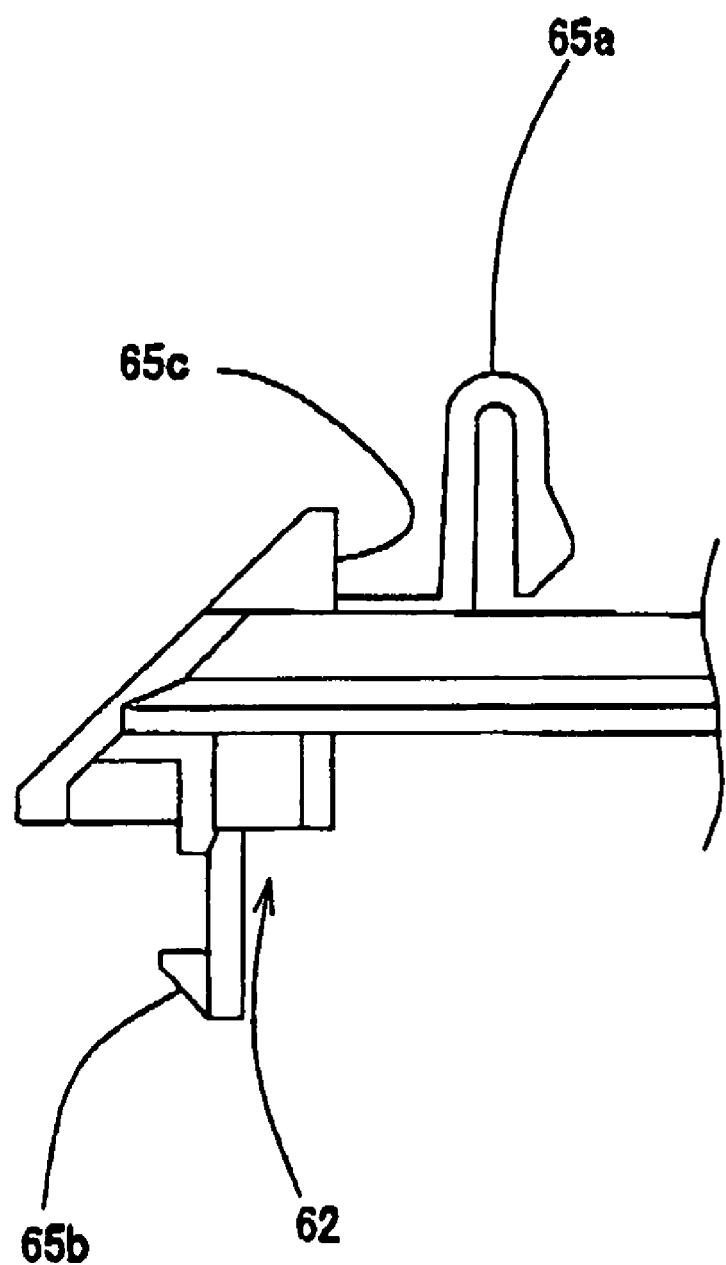
FIG. 30 is an enlarged view of a portion B in FIG. 24.
Figure 31:
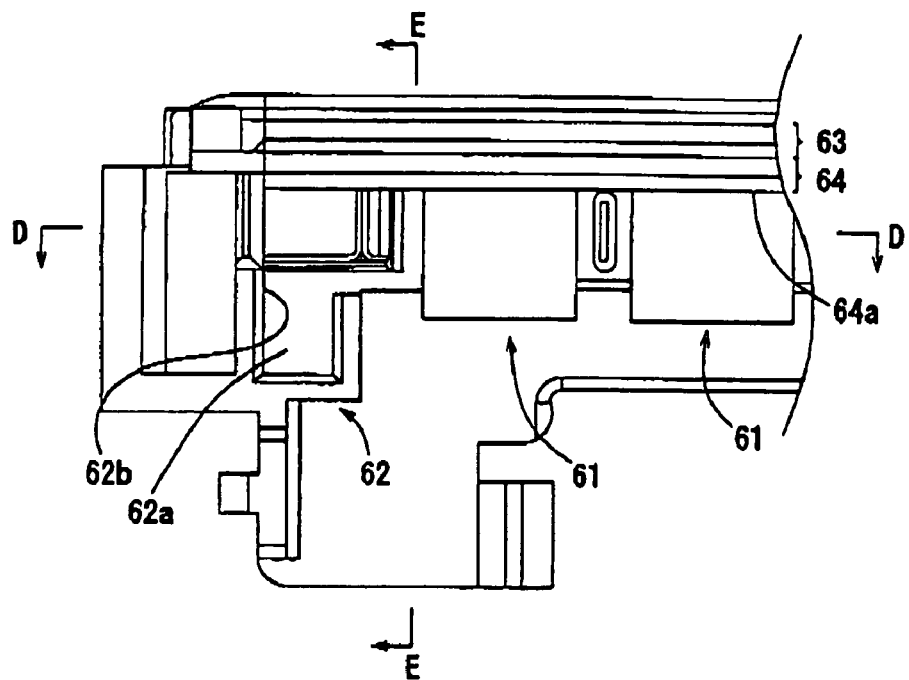
FIG. 31 is an enlarged view of a portion C in FIG. 28.
Figure 32:
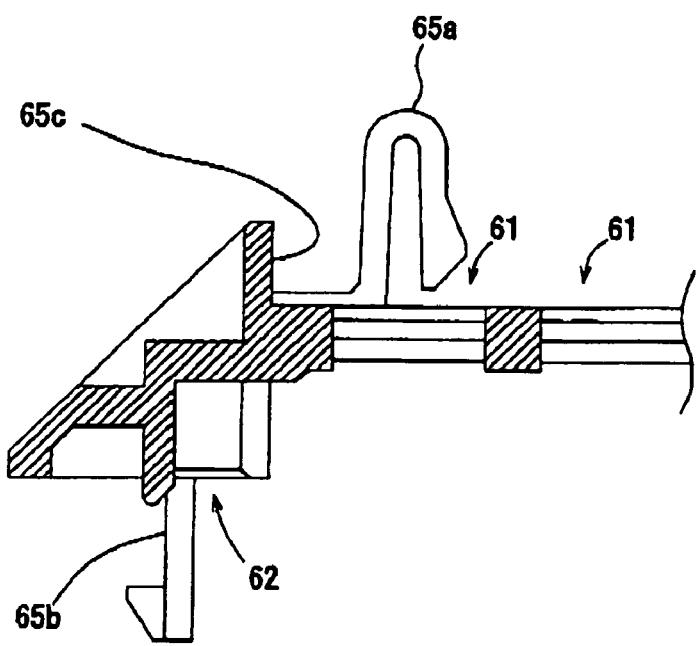
FIG. 32 is a sectional view taken along line D-D in FIG. 31.
Figure 33:
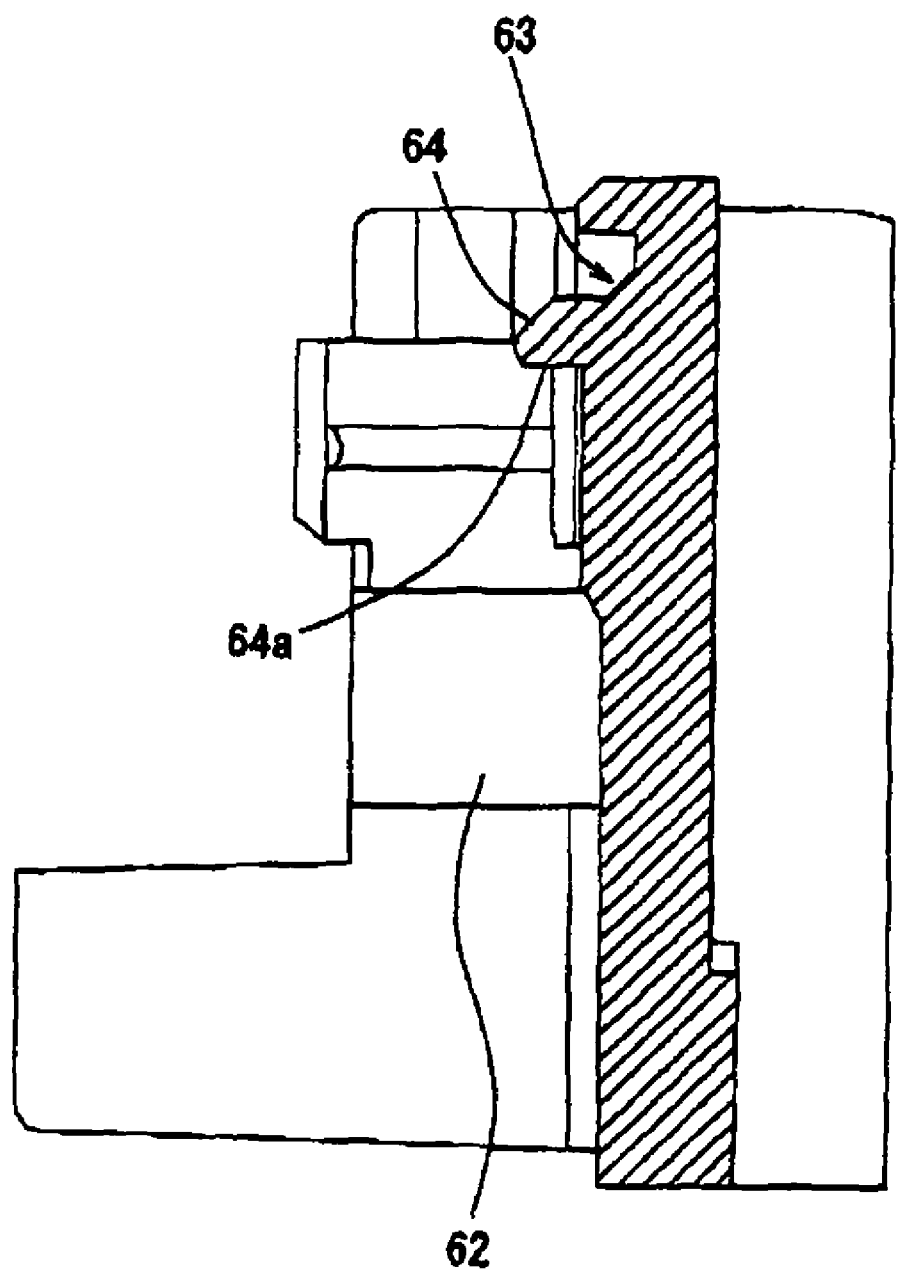
FIG. 33 is a sectional view taken along line E-E in FIG. 31.
Figure 34:
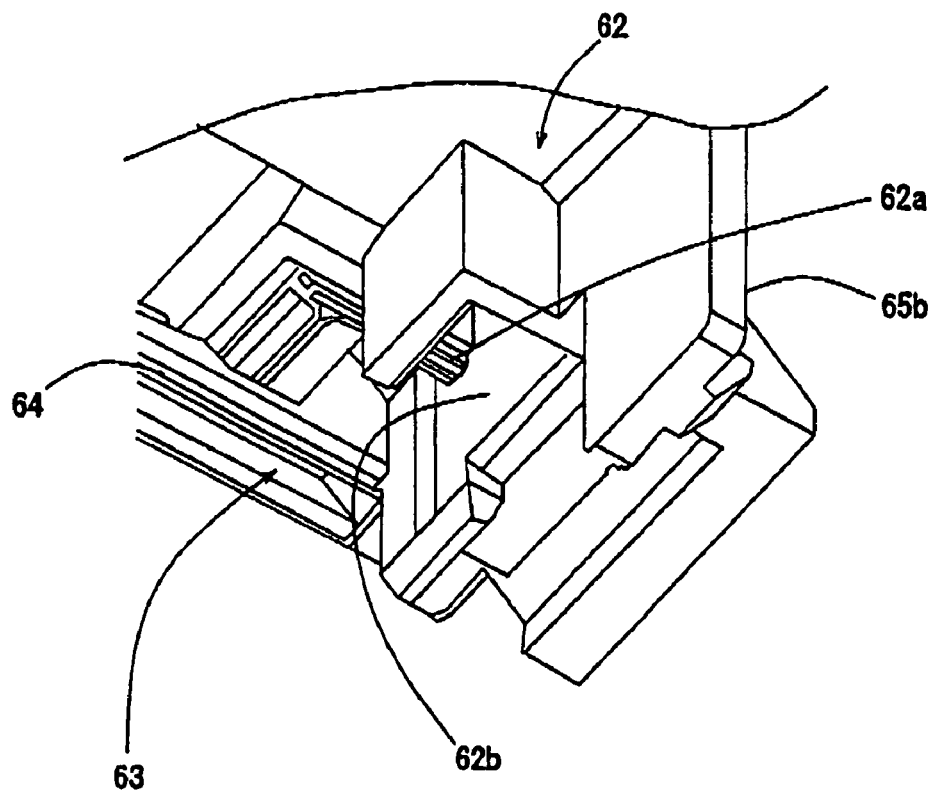
FIG. 34 is a perspective view showing a left edge of the upper holder 60 when obliquely viewed from bottom.

Subsequently, a configuration of the upper holder 60 will be described in detail with reference to FIGS. 1 and 24 to 34. FIGS. 24 to 28 are a front view, a rear view, a left side view, a plane view and a bottom view of the upper holder 60, respectively. FIG. 29 is a sectional view taken along line A-A in FIG. 24, FIG. 30 is an partially enlarged view of a portion B in FIG. 24, FIG. 31 is an partially enlarged view of a portion C in FIG. 28, FIG. 32 is a sectional view taken along line D-D in FIG. 31, and FIG. 33 is a sectional view taken along line E-E in FIG. 31. FIG. 34 is a view showing a left edge of the upper holder 60 when obliquely viewed from bottom.

The upper holder 60 has a substantial linear bilateral symmetrical shape and its length is slightly shorter than the width of the light guide 30. The upper holder 60 is an integrally-formed article made of white resin (polycarbonate).

A plurality of rectangular openings 61 is longitudinally formed at certain intervals in the front end of the upper holder 60. An LED lamp 72, which will be described later, is received in each opening 61.

A maintenance portion 62 for the rib 34 for maintenance of the light guide 30 is provided in the lower side of the left and right edges of the upper holder 60. The maintenance portion 62 has a box-like shape with its front (the front side of the backlight unit 1) and its bottom (the bottom side of the backlight unit 1) opened (FIGS. 30 to 32). In addition, a step face 68 formed into a shape corresponding to the top step face 35 of the light guide 30 is provided at a position near the opening 61 at the end (FIGS. 31 and 32). When the upper holder 60 is mounted on the upper end of the shield case 10, this step face 68 contacts the top step face 35 of the light guide 30.

On the other hand, a concave streak portion 63 and a convex streak portion 64 are formed in the lower side of the front end of the upper holder 60 over substantial overall width of the upper holder 60 (FIGS. 31 and 33). As shown, the concave streak portion 63 is positioned in the front.

A first narrow extension portion 65 is formed in the left and right edges of the rear end of the upper holder 60 and a second narrow extension portion 66 is formed in the central position thereof. In addition, four wide extension portions 67 are formed to be inserted into the first narrow extension portion 65 and the second narrow extension portion 66 with a positional relation of bilateral symmetry.

An engaging leg 65a is provided in the top side of the first narrow extension portion 65 and an engaging leg 65b is provided in the bottom side thereof. In addition, two engaging legs 66a are provided in the top side of the second narrow extension portion 66. On the other hand, a tongue-like engaging leg 67a extending downward is provided in each wide extension portions 67 at a substantial central position. In addition, each wide extension portion 67 has a projection 67b for positioning at its top side. In addition, a support wall 65c which projects upward and is 3.2 mm in height is formed in the left and right edges of the top side of the upper holder 60.

Figure 35:
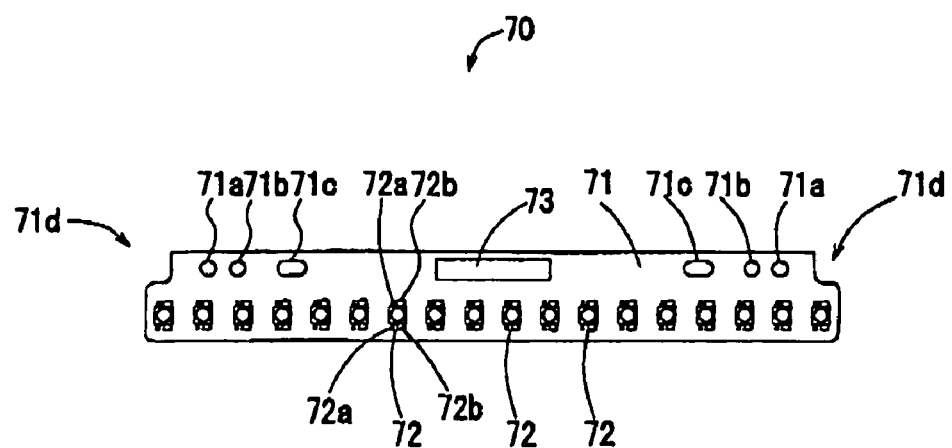
FIG. 35 is a plan view of a print board assy 70.

As shown in FIG. 35, the print board assy 70 is configured such that LED lamps 72 are mounted on its one side Al board 71. The print board assy 70 is connected to a control circuit and a power source via a connector 73. Two print board assies 70 having the same configuration are used in the backlight unit 1. The LED lamps 72 are longitudinally mounted in a region of the front end of the board 71 in line at equal intervals. On the other hand, a region of the rear end thereof is used for mount and fixation of the print board assy 70, and therein are formed holes 71a and 71b for positioning and fixation of the shield case 10, a hole 71c for positioning and fixation of the upper holder 60, and a cut-out portion 71d used for maintenance by the upper holder 60. In addition, a connector 73 is also provided in the region of the rear end. Reference numeral 71e denotes a side end of the board 71.

The LED lamps 72 are surface mounting type (SMD type) LED lamps that emit white light, and have a structure in which a blue emission LED chip is surrounded by a reflector made of white resin and is sealed by yellow fluorescent substance-contained resin. Reference numerals 72a and 72b denote an electrode lead and a heat radiation lead, respectively. Heat from the LED lamps 72 is efficiently radiated to the board 71 via the heat radiation lead 72b.

Both of the left holder 80 and the right holder 85 are integrally-formed articles made of ABS resin and have the same height (length in a longitudinal direction) as the shield case 10 (FIG. 1). The lower ends 81 and 86 of the holders project with an L-shaped section. The projection has screw holes and is used for fixation of the holders to the shield case 10. Same screw holes for fixation are formed in the substantial center of the holders.

Figure 36:
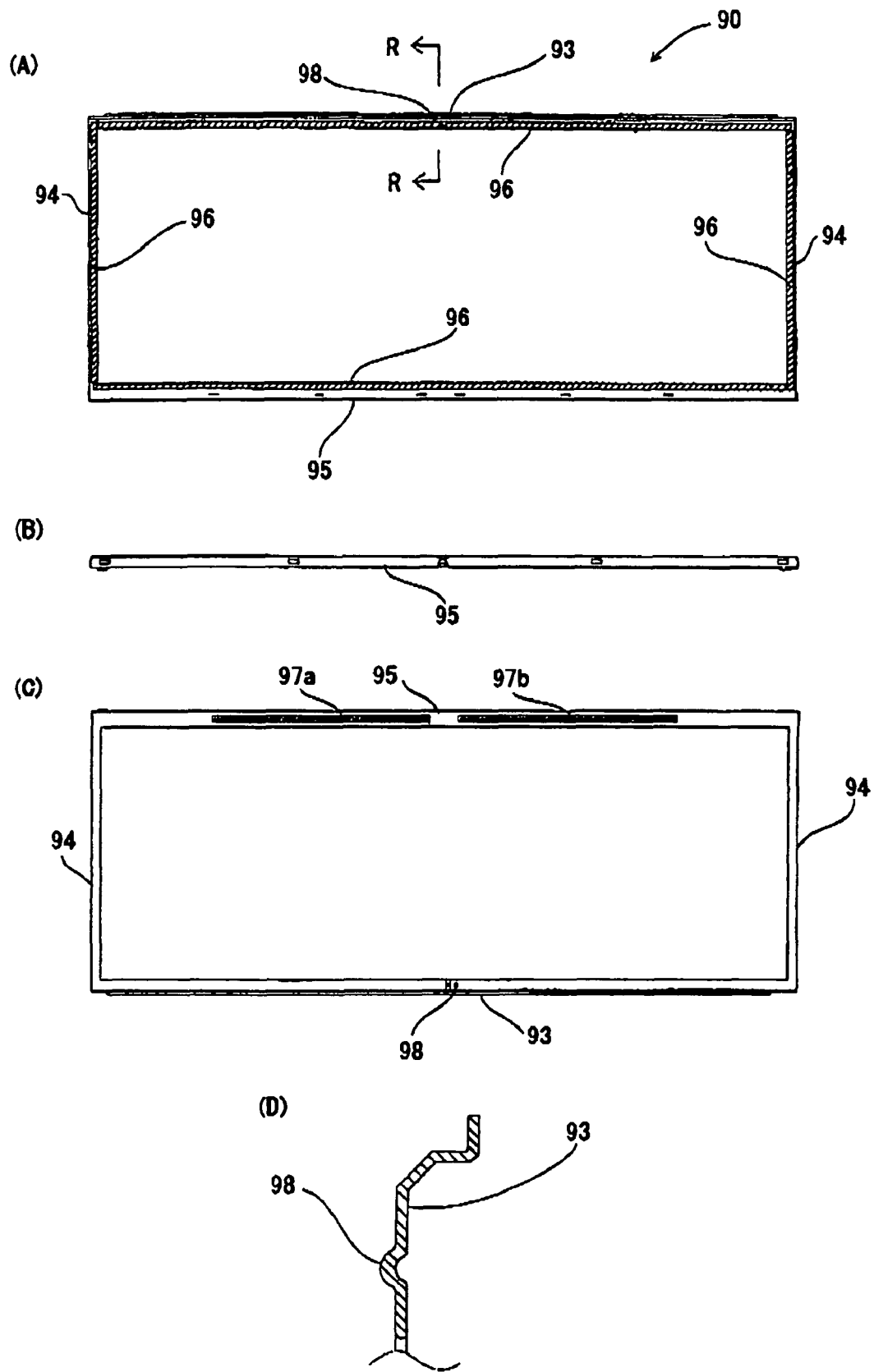
FIGS. 36A, 36B, 36C and 36D are a front view of a TFT holder 90, a bottom view of the TFT holder 90, a rear view of the TFT holder 90, and a sectional view taken along line R-R in FIG. 36A, respectively.

Next, a configuration of the TFT holder (liquid crystal panel maintenance member) 90 will be described in detail with reference to FIGS. 1 and 36. FIGS. 36A, 36B and 36C are a front view, a bottom view and a rear view of the TFT holder 90, respectively. FIG. 36D is a sectional view taken along line R-R in FIG. 36A. The TFT holder (liquid crystal panel maintenance member) 90 is a frame-shaped member (FIG. 1) on which a TFT panel is placed when a liquid crystal display device is constructed later. The TFT holder 90 is also used for maintenance of the optical sheets. The left and right edges 91 and 92 of the TFT holder 90 are bent to the rear side and have holes 91a and 92a formed at about equal intervals. The holes are used for fixation to the shield case 10, A first projection 98 projecting to the rear side, that is, the optical sheets, is provided near the center of the upper edge 93 of the TFT holder 90. The first projection 98 is used for fixation of the optical sheets. Specifically, as shown in FIG. 36A, the TFT holder 90 is composed of an upper end 93 having width of about 5.0 mm, left and right frames 94 having width of about 4.0 mm, and a lower end 95 having width of about 8.0 mm. In addition, a double-sided tape 96 having width of about 3.0 mm is attached along each side of the inner side of the front. A TFT panel (not shown) is attached via the double-sided tape 96. As shown in FIG. 36D, the first projection 98 has a semispherical shape which projects to the optical sheets and is about 1.0 mm in diameter and about 0.38 mm in height, and is provided at a position distant by about 2.0 mm from the center of the upper edge 93 in a right direction of the paper. The first projection 98 is formed when a punch is impressed from the front side. As shown in FIG. 36C, double-sided tapes 97a and 97b having width of about 2.5 mm and length of about 100.0 mm are attached to the surface of the light guide 30 of the lower end 95. The double-side tape 97a is provided at a position distant by about 6.0 mm from the center of the lower end 95 along the bottom of the TFT holder 90. The double-side tape 97b is provided at a position which is bilaterally symmetrical to the double-side tape 97a. In an assembled state, these double-sided tapes 97a and 97b are adhered to the ribs 38a to 38d provided in the lower end of the described light guide 30 such that the light guide 30 is bonded to the TFT holder 90. In addition, the double-sided used herein are double-sided tapes which include PET resin as a base material, with an adhesive applied on their both sides, and are about 0.085 mm in thickness.

Figure 37:
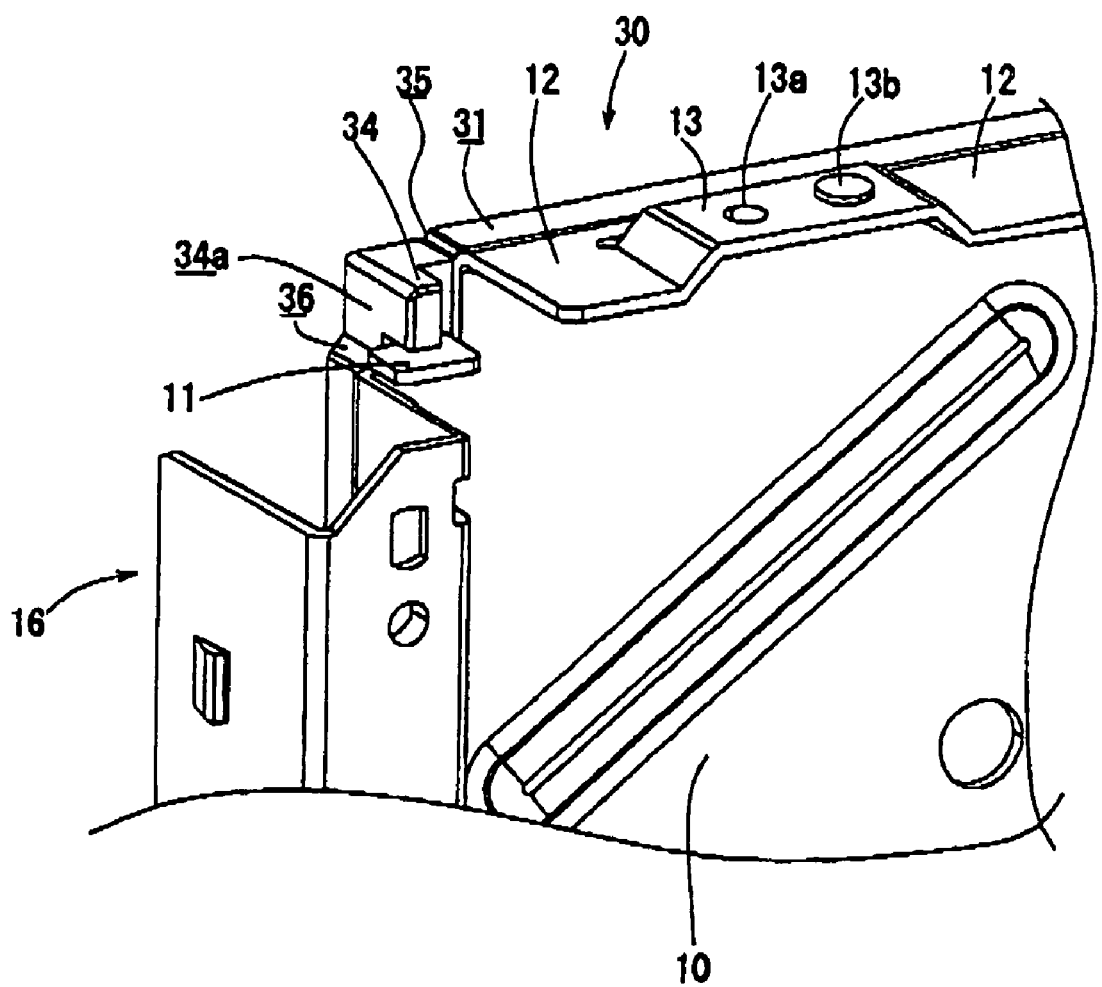
FIG. 37 is a perspective view showing a state where the light guide 30 is placed on the shield case 10.

The backlight unit 1 composed of the above described members can be assembled according the following order. First, the reflecting sheet 20 is placed on the front side of the shield case 10. Next, the light guide 30 is similarly placed on the reflecting sheet 20. At this time, the maintenance rib 34 of the light guide 30 is supported to the rib receiving seat 11 of the shield case 10 (FIG. 37). Thus, the light guide 30 is positioned with respect to the shield case 10.

Figure 38:
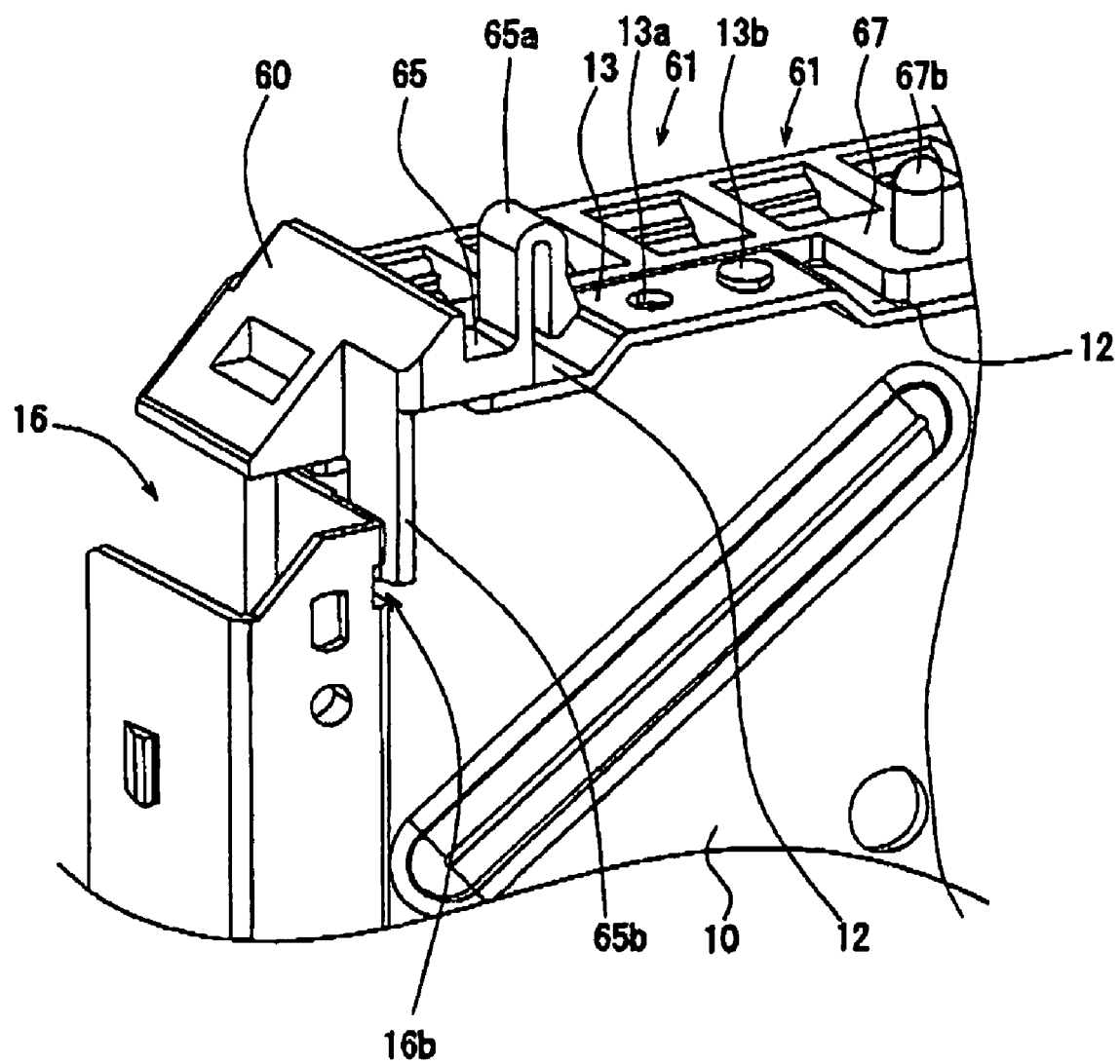
FIG. 38 is a perspective view showing a state where the light guide 30 is mounted on the upper holder 60.
Figure 39:
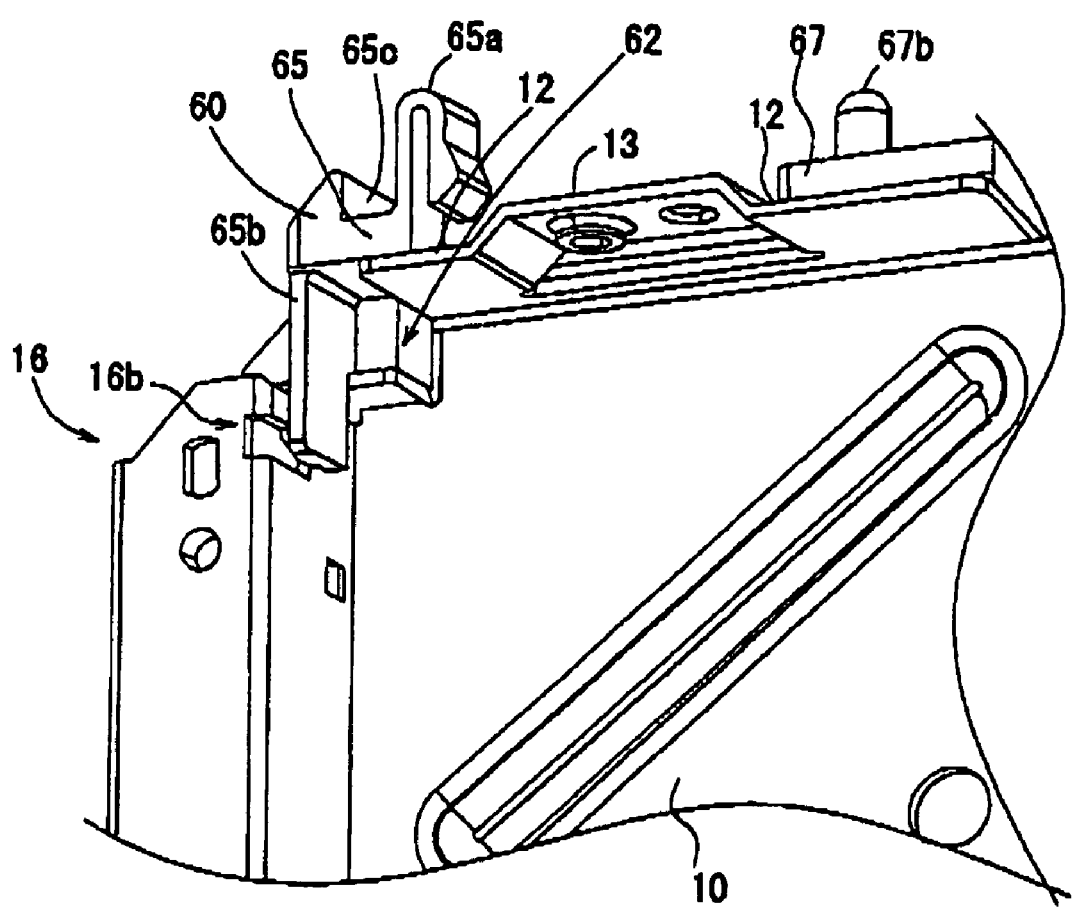
FIG. 39 is a perspective view showing a state where the light guide 30 is mounted on the upper holder 60.

Subsequently, the upper holder 60 is mounted on the upper end of the shield case 10 (FIGS. 38 and 39). The engaging legs 65b and 67a provided in the upper holder 60 are used to mount the upper holder 60. That is, the upper holder 60 is put on the upper end of the shield case 10 with a predetermined positional relation, the engaging leg 65b is engaged with the engaging holes 15b and 16b formed in the grooves 15 and 16 of the shield case 10 (FIGS. 38 and 39), and the engaging leg 67a is engaged with the lead end of the tongue piece 14 of the shield case 10. At this time, the bottom of the extension portions 65 to 67 of the upper holder 60 contacts the upper holder receiving seat 12 of the shield case 10. On the other hand, the maintenance rib 34 of the light guide 30 is received in the maintenance portion 62 of the upper holder 60, and is vertically held by the ceiling 62a of the maintenance portion 62 and the rib receiving seat 11 of the shield case 10. At the same time, the outer side 34a of the maintenance rib 34 contacts the inner wall 62b of the maintenance portion 62 (FIGS. 34 and 37 to 39). Thus, the light guide 30 is maintained in the shield case 10 with it positioned with good precision in the horizontal direction. In addition, during or after subsequent assembly (during assembly of a liquid crystal panel or use of the backlight unit), it is possible to prevent position deviation of the light guide 30 in the horizontal direction.

Here, the above-described maintenance portion 62 has a box-like shape with its front and rear opened, and when the upper holder 60 is mounted on the shield case 10, the maintenance rib 34 is surrounded by the maintenance portion 62 and the rib receiving seat 11 (FIG. 39). That is, as the maintenance rib 34 is maintained in a near sealed state by the upper holder 60 and the shield case 10, it becomes difficult for dusts to penetrate from the vicinity of the maintenance rib 34. In this manner, in cooperation with the shield case 10 and the rib receiving seat 11, the upper holder 60 forms a dust penetration prevention structure to prevent dusts from penetrating into the light incidence region 31, the light emission region 32a and so on of the light guide 30.

Figure 2:
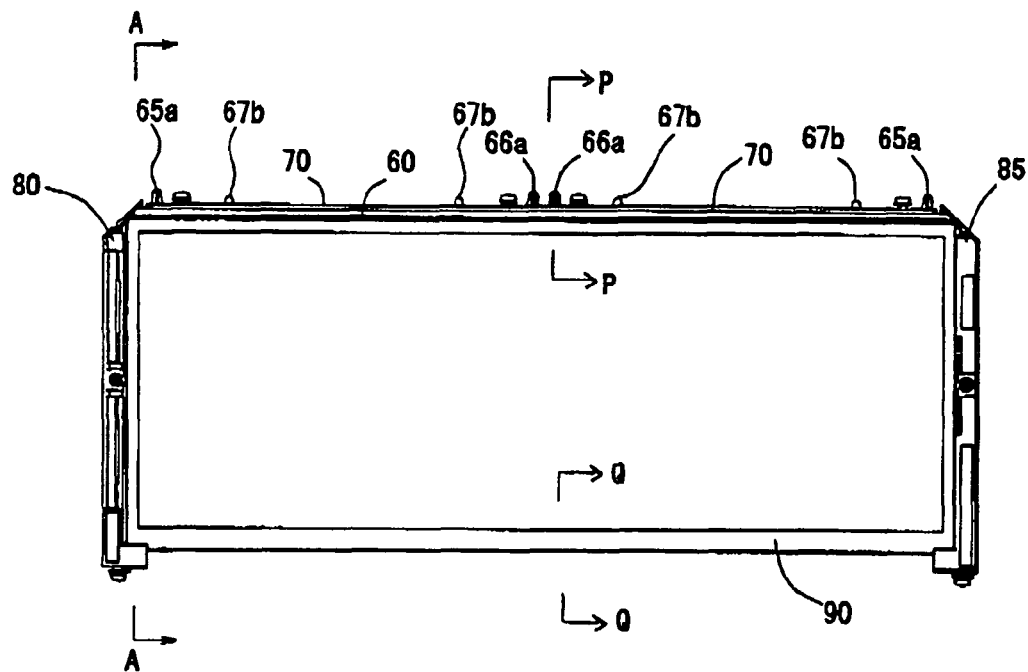
FIG. 2 is a front view of the backlight unit 1.
Figure 3:
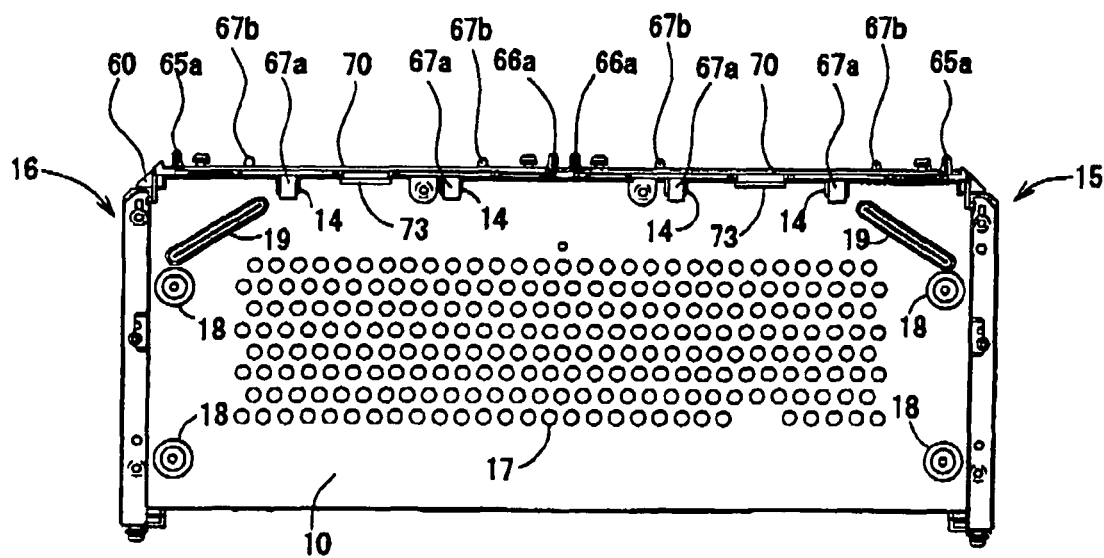
FIG. 3 is a rear view of the backlight unit 1.
Figure 4:
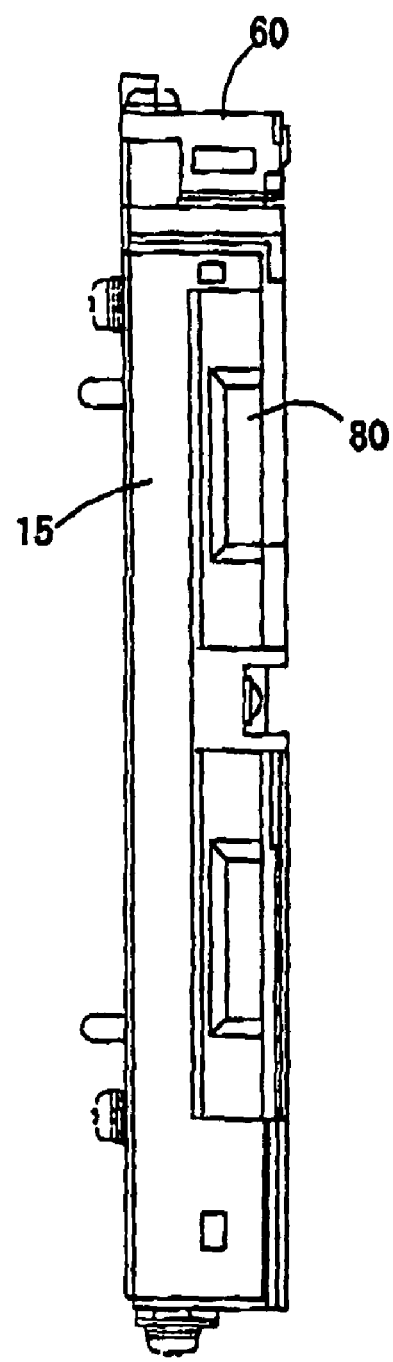
FIG. 4 is a left side view of the backlight unit 1.
Figure 5:
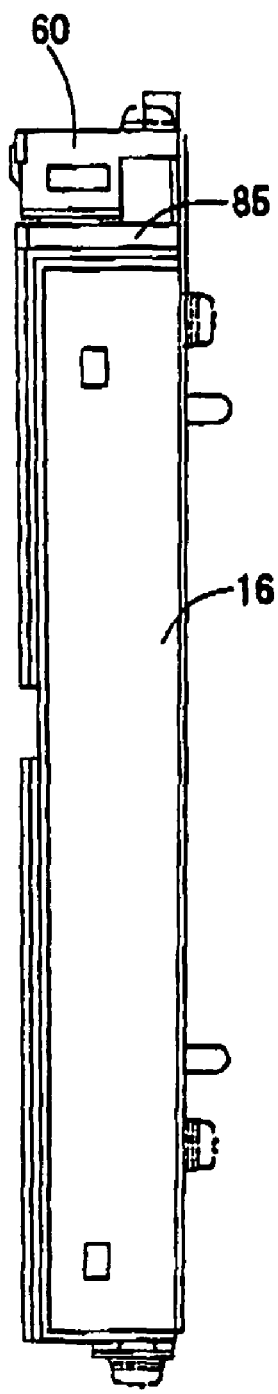
FIG. 5 is a right side view of the backlight unit 1.
Figure 6:
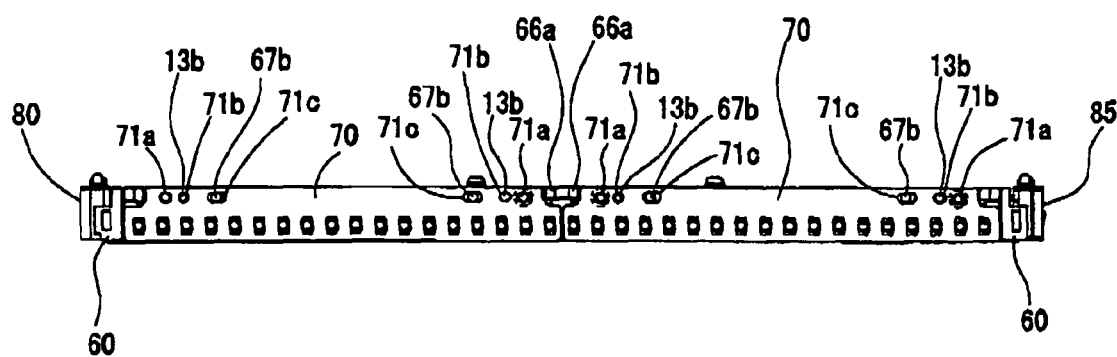
FIG. 6 is a plan view of the backlight unit 1.
Figure 7:
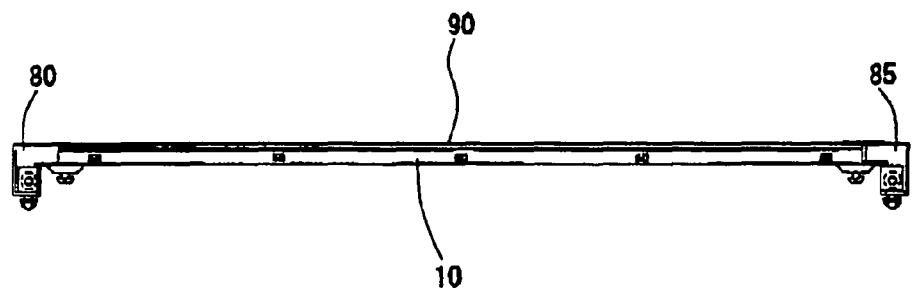
FIG. 7 is a bottom view of the backlight unit 1.
Figure 40:
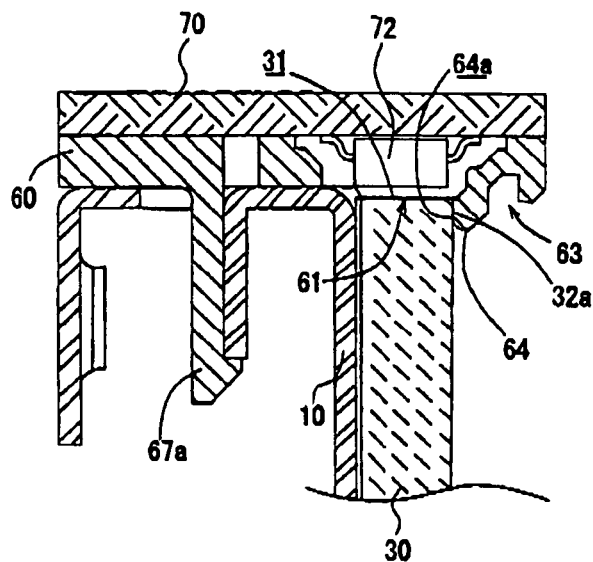
FIGS. 40A, 40B and 40C are a sectional view showing a state where the upper holder 60 and the print board assy 70 are mounted on the light guide 30, which is taken along line P-P in FIG. 2, a sectional view showing a state where the TFT holder 90 is mounted on the light guide 30, which is taken along line P-P in FIG. 2, and a sectional view showing a state where the TFT holder 90 is mounted on the light guide 30, which is taken along line Q-Q in FIG. 2, respectively.
Figure 40:
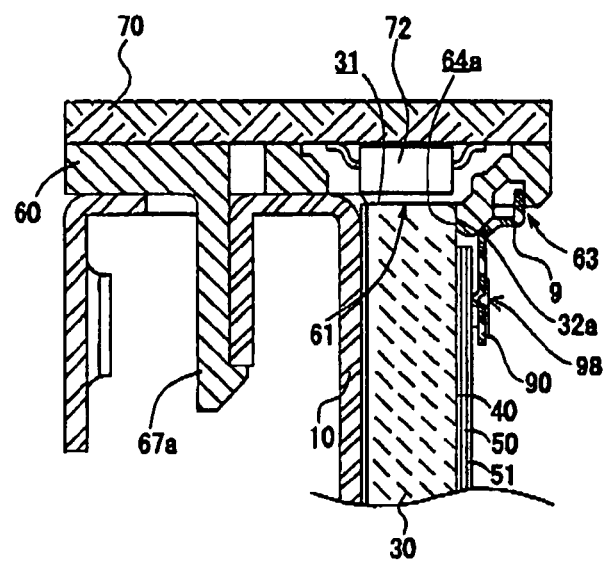
Figure 40:
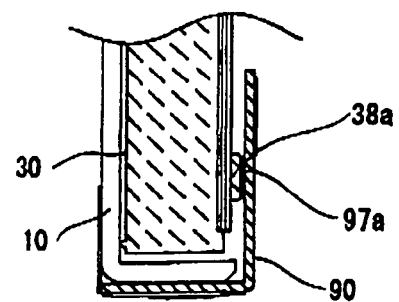

FIGS. 40A and 40B are sectional views taken along line P-P in FIG. 2, and FIG. 40C is a sectional view taken along line Q-Q in FIG. 2. When the upper holder 60 is mounted, the rear side 64a of the concave streak portion 64 of the upper holder 60 contacts the upper end region 32a of the front of the light guide 30 (FIG. 40A). In this manner, since a biasing force to the rear side by the concave streak portion 64 is exerted on the light guide 30, the light guide 30 is maintained in the front and rear directions with respect to the shield case 10.

Next, the print board assy 70 is mounted on the upper holder 60 using the engaging legs 65a and 65b of the upper holder 60 and the positioning projection 67b of the wide extension portion 67. That is, the print board assy 70 is put on the top side of the upper holder 60 with a predetermined positional relation, with an LED lamp mounting surface set downward. In addition, the engaging legs 65a and 65b of the upper holder 60 are engaged with the cut-out portion 71d of the print board assy 70, and the positioning projection 67b of the wide extension portion 67 of the upper holder 60 is inserted into the corresponding hole 71c of the print board assy 70 side. At this time, the positioning projection 13b formed in the print board assy receiving seat 13 of the shield case 10 is inserted into the corresponding hole 71b of the print board assy 70 side, and at the same time, the LED lamp mounting surface of the print board assy 70 contacts the print board assy receiving seat 13. Thus, the print board assy 70 is temporarily fixed to the shield case 10 with a predetermined positional relation. Thereafter, they are together fixed by screws through the screw hole 71a. In this manner, the print board assy 70 is fixed to the shield case 10.

As described above, since the positioning, maintenance and fixation are made between three members, that is, the shield case 10, the upper holder 60 and the print board assy 70, it is possible to prevent position deviation after assembly while raising the positioning precision.

As shown in FIG. 40A, when the print board assy 70 is mounted, the LED lamps 72 are received in the openings 61 of the upper holder 60. The height of the openings 61 is about equal to the height of the LED lamps 72, and the light emission surface of the LED lamps 72 approaches the upper end (light incidence region 31) of the light guide 30. Thus, light from the LED lamps 72 can be efficiently incident into the light guide 30.

After the upper holder 60 and the print board assy 70 are mounted in this manner, the diffusing sheet 40, the vertical eye prism sheet 50 and the horizontal eye prism sheet 51 are placed in order on the front side 32 of the light guide 30. At this time, the holes 41a, 41g, 41f, 41h and 41b the first cut-out portion 41c provided in the optical sheets are inserted into the corresponding pins 37a, 37g, 37f, 37h, 37b and 37c of the light guide 30 (see FIGS. 22 and 23). At this time, a horizontal reference is defined by the pin 37c and the first cut-out portion 41c, and vertical positioning is made between the pin 37a and the hole 41a, between the pin 37g and the hole 41g, between the pin 37f and the hole 41f, between the pin 37h and the hole 41h, and between the pin 37b and the hole 41b. Thus, the optical sheets 40, 50 and 51 are positioned on the light guide 30.

Subsequently, by inserting the upper end 93 of the TFT holder 90 into the concave streak portion 63 of the upper holder 60 in a state slightly inclined with respect to the optical sheet surface (see FIG. 40B) and then pressing it while rotating it toward the optical sheets with the upper end 93 as a fulcrum, the holes 91a and 92a provided in both edges of the TFT holder 90 are engaged with the corresponding engaging claws 15c and 16c of the holder receiving portions 15 and 16 of the shield case 10. According to this, the ribs 38a to 38d of the lower end of the light guide 30 are bonded to the double-sided tapes 97a and 97b attached to the inner side of the lower end 95 of the TFT holder 90, and accordingly, the TFT holder 90 is bonded to the light guide 30 (see FIG. 40C). In addition, as the first projection 98 of the top edge 93 contacts the optical sheet 40, the optical sheets 40, 50 and 51 are pressed against the light guide 30 side (see FIG. 40B). Thus, the optical sheets 40, 50 and 51 are held and fixed by the TFT holder 90 and the light guide 30 in that the first projection 98 contacts the optical sheet 40. In this manner, each optical sheet is positioned on the light guide 30 by each pin and each cut-out portion and is held and fixed at one point. That is, as each optical sheet is fixed, each end is mounted in a free state for expansion and contraction.

Finally, the left holder 80 and the right holder 85 are inserted into the holder receiving portion 15 and are fixed by screws.

An aspect of emission of the backlight unit 1 assembled as above is as follows. First, white light emitted from the LED lamps 72 is incident into the light incidence region 31 of the backlight guide 30. The light introduced into the light guide 30 propagates in the light guide 30, a majority of the light is finally emitted from the light emission region 32a of the front side 32 of the light guide 30. In the light guide 30, light propagating in the front direction is efficiently generated, guided and diffused by a reflection and diffusion action of the rear side and the reflecting sheet 20. As a result, light with high brightness and less brightness spot is emitted from the light emission region 32a of the light guide 30. The light emitted from the light emission region 32a of the light guide 30 is further equalized in terms of brightness by the diffusing sheet 40, and then is adjusted in terms of directionality by passing through each prism sheet 50 and 51. Thus, surface light as a combination of fluxes of light is emitted through the openings of the TFT holder 90.

In the backlight unit 1 of this embodiment, by vertically holding the maintenance rib 34 formed on the upper end of the light guide 30 by means of the shield case 10 and the upper holder 60, the upper end of the light guide 30 is maintained in the shield case 10 and the lower end of the light guide 30 becomes free (free end). Thus, a configuration to allow for tracking to temperature variation in use of the backlight unit 1 can be realized. That is, since the a sufficient clearance is secure between the light guide 30 except for the upper end of the light guide 30 and the shield case 10, the light guide 30 does not interfere with other adjacent members even if it is expanded according to temperature variation. In this manner, in the backlight unit 1, by using special maintenance means, interference between the shield case 10 and the light guide 30 can be avoided in spite of a large difference in coefficient of thermal expansion between them.

On the other hand, by employing the above maintenance means, the position of the light guide 30 with respect to the shield case 10 can be determined with good precision. At the same time, the light guide 30 can be maintained in the shield case 10 with reliable and high maintenance power, a structure robust to vibration can be attained. Accordingly, it is possible to prevent the light guide 30 from clicking and hence prevent a strange noise from being generated in use under vibratile environments, such as in a vehicle. In particular, by fixing the ribs 38a to 38d and the TFT holder 90 of the light guide 30 by means of the double-sided tapes 97a and 97b, the double-sided tapes 97a and 97b function as a buffering material to alleviate interference between the light guide 30 and the TFT holder 90, thereby preventing clicking and hence generation of a strange noise. In particular, in the vicinity of the pin 37c at the bottom center of the light guide 30, which is apt to click in structural respect, by arranging the ribs 38a to 38d bisymmetrically in both sides of the lower edge of the light guide 30, interference between the pin 37c and the TFT holder 90 is reliably prevented, thereby reliably preventing generation of a strange noise. In addition, since the ribs 38a to 38d are formed in the lower end far away from the light incidence region 31 (upper end) of the light guide 30, an effect on light incident from the light incidence region 31 (bright line, generation of diffused light, light leakage, etc) is reduced. Thus, deterioration of use efficiency of light is prevented.

In addition, in the backlight unit 1, as described above, since no stress is applied to the optical sheets even when the light guide 30 and the optical sheets (the diffusing sheet 40, the vertical eye prism sheet 50 and the horizontal eye prism sheet 51) are expanded/contracted, it is possible to prevent the optical sheets from being deformed and bent due to the expansion/contraction of the light guide 30 and the optical sheets.

First, each optical sheet is fixed at only one point at which the first projection 98 contacts the optical sheet 40. Thus, the light guide is free from the expansion/contraction in both of the vertical and horizontal directions, thereby preventing position deviation and generation of a strange noise by clicking. Specifically, from the respect that the holes are affected by the expansion/contraction in the horizontal direction (that is, position variation in the horizontal direction is noticeable) and the holes are positioned at substantially the same height as the fixation point of the optical sheet 40 (a point at which the first projection 98 contacts the optical sheet 40), by making the holes 41a, 41g, 41f, 41h and 41b (see FIGS. 22 and 23) at a position which is little affected by the expansion/contraction in the vertical direction long in the horizontal direction and minimizing a vertical clearance, it is possible to follow the position variation in the horizontal direction while preventing the positional deviation in the vertical direction due to the expansion/contraction. Likewise, from the respect that the cut-out portion is greatly affected by the expansion/contraction in the vertical direction (that is, position variation in the vertical direction is noticeable) and the cut-out portion is positioned at the center with respect to the horizontal direction, like the fixation point of the optical sheet 40, by making the cut-out portion 41c at a position which is little affected by the expansion/contraction in the horizontal direction long in the vertical direction and minimizing a horizontal clearance, it is possible to follow the position variation in the vertical direction while preventing the positional deviation in the horizontal direction due to the expansion/contraction.

By the above design for the holes 41a, 41g, 41f, 41h and 41b and the cut-out portion 41c, when the positional relation between the light guide 30 and the optical sheets is varied due to the expansion/contraction of the light guide 30 and/or the optical sheets, for the holes 41a, 41g, 41f, 41h and 41b of the upper end, the pins 37a, 37g, 37h, 37f and 36b in the first hole 41a and the second hole 41b of the upper end are relatively moved in the horizontal direction (see FIG. 23), while the pin 37c in the cut-out portion 41c of the center of the lower end is relatively moved in the vertical direction. As a result of such pin movement, no stress is applied to the optical sheets.

As described above, by skillfully calculating an effect of expansion/contraction at each position and designing each holes, a configuration to prevent positional deviation and follow position variation due to the expansion/contraction is realized.

In addition, in the backlight unit 1, the maintenance portion 62 of the upper holder 60 and the rib receiving seat 11 of the shield case 10 surround the maintenance rib 34 of the light guide 30 to prevent dusts from penetrating from the vicinity of the upper end of the light guide 30. With such a structure to effectively prevent the penetration of dusts, it is possible to prevent deterioration of quality such as generation of diffused light, deterioration of brightness and the like. In addition, since the base material of the double-sided tapes 97a and 97b is PET resin, alien substances such as dusts are prevented from being generated due to any deterioration or the like. Thus, it is possible to prevent quality deterioration such as generation of diffused light, brightness deterioration and the like.

Figure 41:
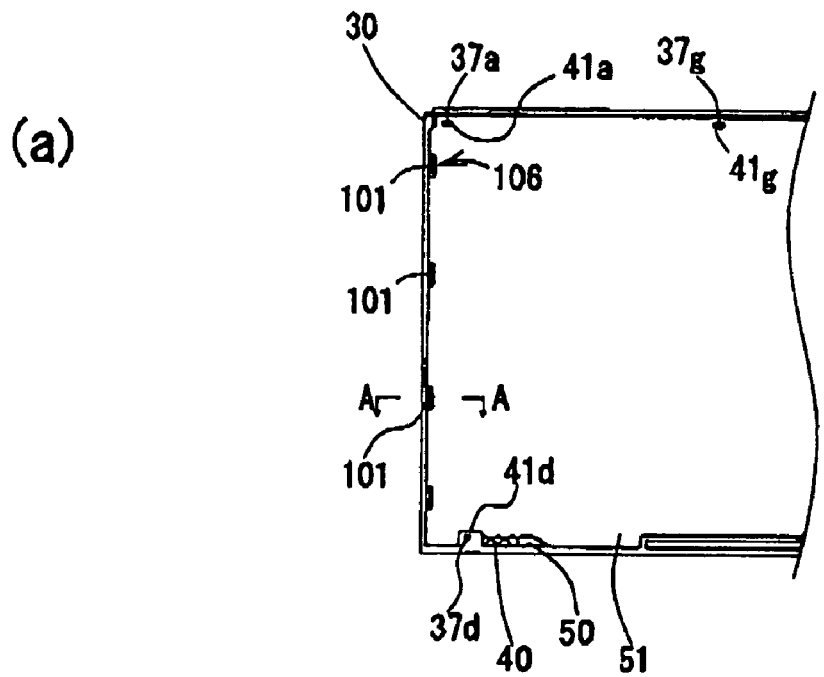
FIGS. 41A, 41B and 41C are a plan view showing a state where an optical sheet is maintained on the light guide 30, an enlarged view of a portion A, and a sectional view taken along line B-B, respectively.
Figure 41:
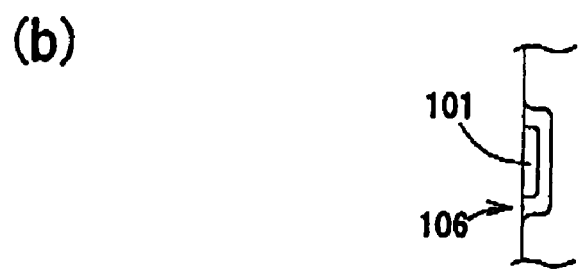
Figure 41:
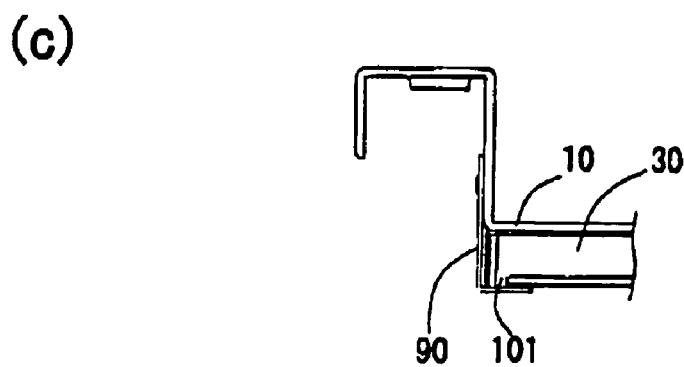

FIG. 41A is a plan view showing an modified example of the light guide 30 and the optical sheets. FIG. 41B is an enlarged view of a portion A in FIG. 41A, and FIG. 41C is a sectional view taken along line B-B in FIG. 41A. As shown in FIG. 41A, the light guide 30 has a plurality of rib-shaped small projections 101 arranged at equal intervals along the left and right edges of the front side. Correspondingly, a cut-out portion 106 is formed in each optical sheet 40, 41 and 50. According to this configuration, the TFT holder 90 is supported by the rib-shaped small projections 101, thereby preventing the left and right edges of the optical sheets from being damaged due to interference with the TFT holder 90.

Figure 42:
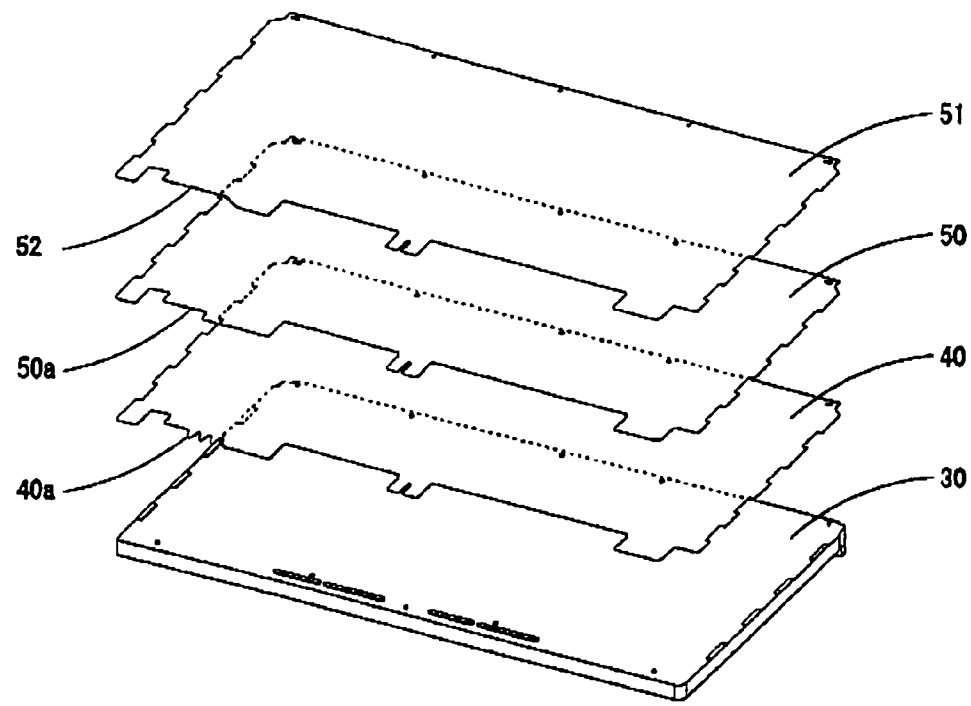
FIG. 42 is a schematic perspective view showing an order of stack of a diffusing sheet 40, a vertical eye prism sheet 50 and a horizontal eye prism sheet 51.
Figure 43:
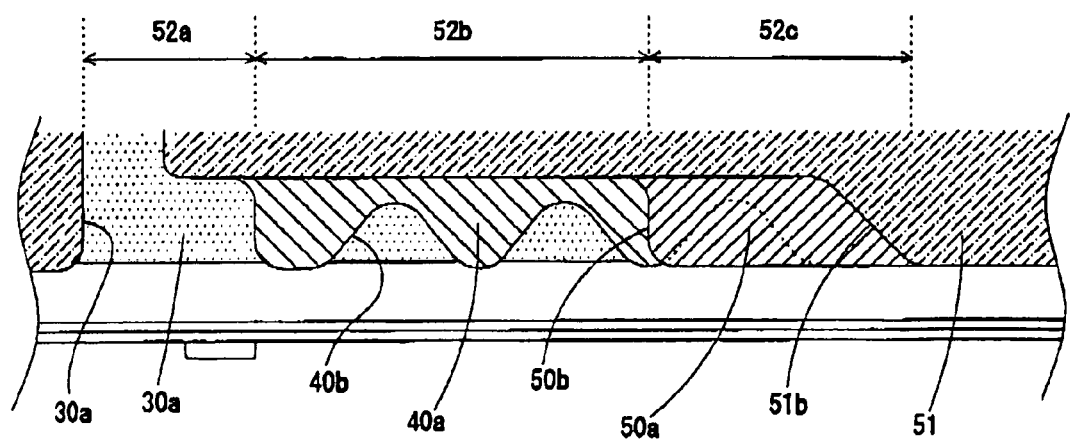
FIG. 43 is a front view of the vicinity of bottom and left side in a state where the diffusing sheet 40, the vertical eye prism sheet 50 and the horizontal eye prism sheet 51 are stacked.

FIG. 42 schematically shows an order of stack of the light guide 30, the diffusing sheet 40, the vertical eye prism sheet 50 and the horizontal eye prism sheet 51. The diffusing sheet 40, the vertical eye prism sheet 50 and the horizontal eye prism sheet 51 are placed in order on the front side 32 of the light guide 30. FIG. 43 is a front view of the vicinity of bottom and left side in a state where three optical sheets 40, 50 and 51 are stacked in order. In the horizontal eye prism sheet 51, a portion of the vicinity of bottom and left side is cut out to form a window 52. The shape of the window 52 has a substantial trapezoidal shape whose top and bottom side are in parallel, whose left side 51a is substantially perpendicular to the top and bottom sides, and whose right side 51b is an oblique side. From the window 52, the light guide 30, the diffusing sheet 40 and the vertical eye prism sheet 50 from the left side 51a are exposed in order. A portion (light guide exposing portion) 30a of the light guide 30 exposed from the window 52 is rectangular. On the other hand, a portion (first exposing portion) 40a of the diffusing sheet 40 exposed from a window 51a has a wave-like lower end 40b. A portion (second exposing portion) 50a of the vertical eye prism sheet 51 exposed from the window 52 is trapezoidal. In this manner, since the shape of the first exposing portion 40a is definitely different from the shape of the second exposing portion 50a, the diffusing sheet 40 and the vertical eye prism sheet 50 can be easily perceived. In addition, since the second exposing portion 50a covers a portion of the diffusing sheet 40, when the diffusing sheet 40 is stacked on the vertical eye prism sheet 50, the second exposing portion 50a covers the diffusing sheet 40 such that the wave-like lower end 40b continues to be exposed up to the right side 51b. Thus, since a stack of an erroneous order can be easily recognized, it is possible to easily confirm a stack order.

Figure 44:
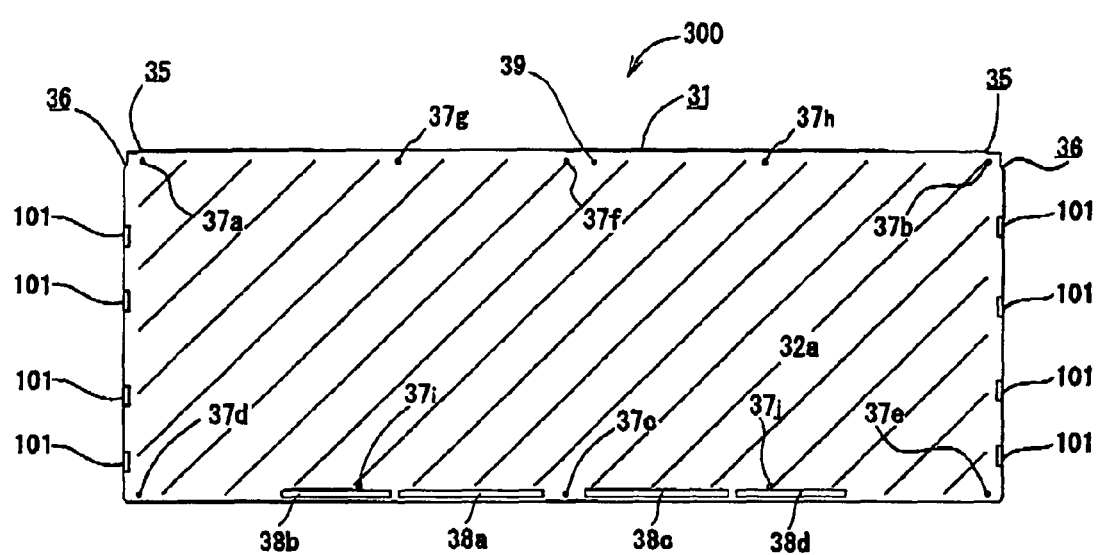
FIG. 44 is a front view of a light guide 300.
Figure 45:
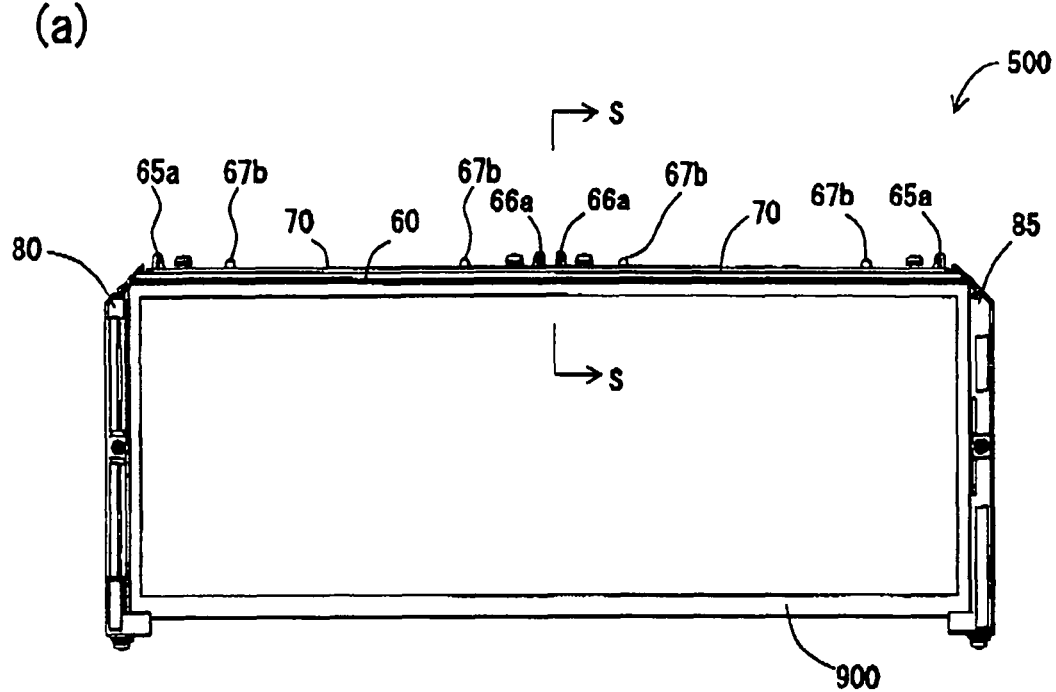
FIGS. 45A and 45B are a front view of a backlight unit 500 and a sectional view taken along line S-S in FIG. 45A, respectively.
Figure 45:
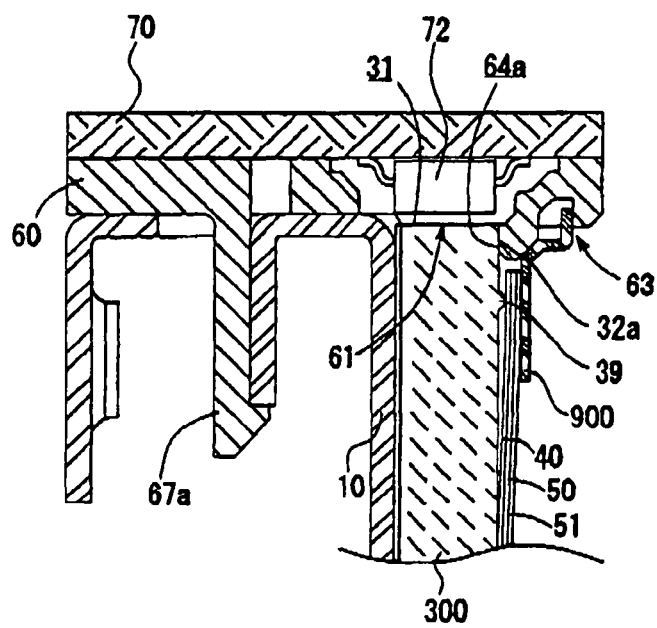

FIG. 44 is a front view of a light guide 300 having a second projection. FIG. 45A is a front view of a backlight unit 500 having the light guide 300, and FIG. 45b is a sectional view taken along line S-S in FIG. 45A. The same members as the backlight unit 1 are denoted by the same reference numerals, and explanation of which will be omitted. The light guide 300 has a second projection 39 at a position distant by about 2.0 mm from the pin 37f of the center of the top edge in the right direction of the paper. The second projection 39 is a semispherical projection which projects toward the optical sheets, and is about 1.0 mm in diameter and about 0.38 mm in height. Like the backlight unit 1, the optical sheets 40, 50 and 51 are placed on the light guide 300 and a TFT holder 900 is mounted thereon. The TFT holder 900 has the same shape as the TFT holder 90 except that the first projection 98 is not provided. As shown in FIG. 45B, the second projection 39 of the light guide 300 contacts the diffusing sheet 40 and the optical sheets 40, 50 and 51 are pressed against the TFT holder 900 side. Thus, the optical sheets 40, 50 and 51 are held and fixed by the TFT holder 900 and the light guide 300 in that the second projection 39 contacts the optical sheet 40. This shows the same effect as the backlight unit 1.

Although the first projection 98 is integrally formed with the TFT holder 90 in the backlight unit 1 and the second projection 39 is integrally formed with the light guide 300 in the backlight unit 500, these projections may be separately provided by small pieces or the like.

Figure 46:
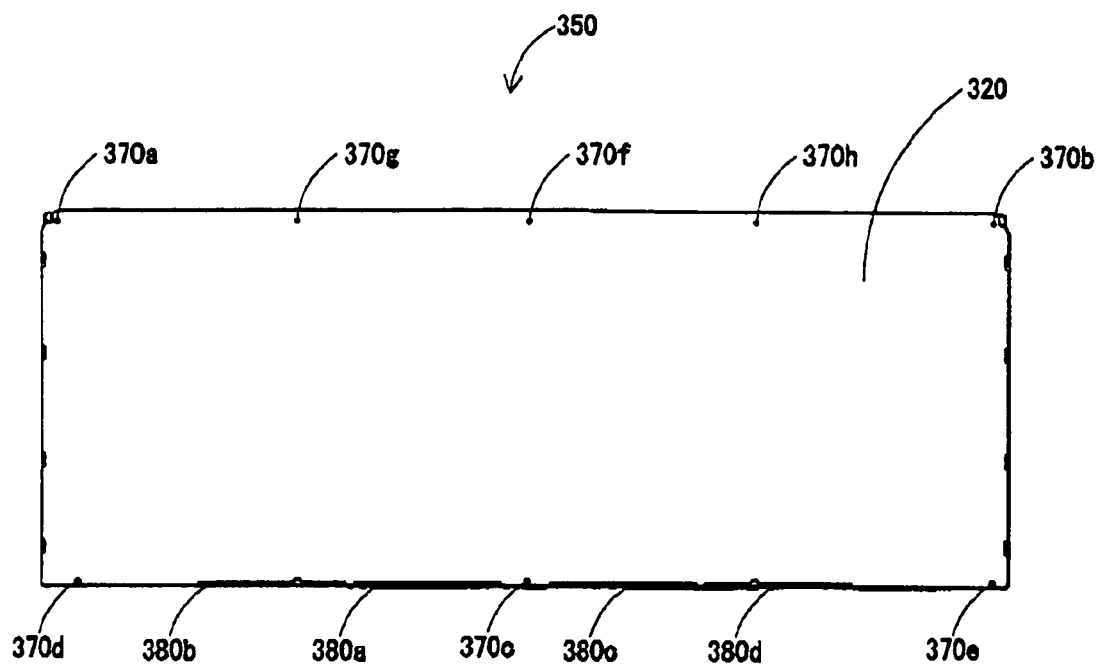
FIG. 46 is a front view of a light guide 350.
Figure 47:
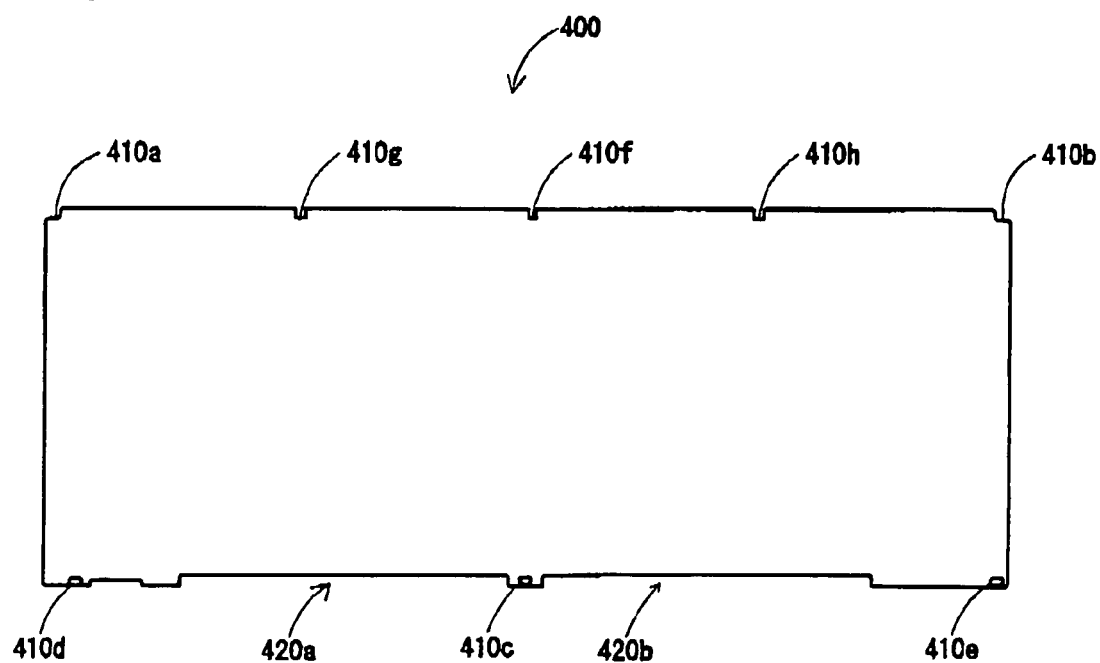
FIG. 47 is a front view of a diffusing sheet 400.
Figure 48:
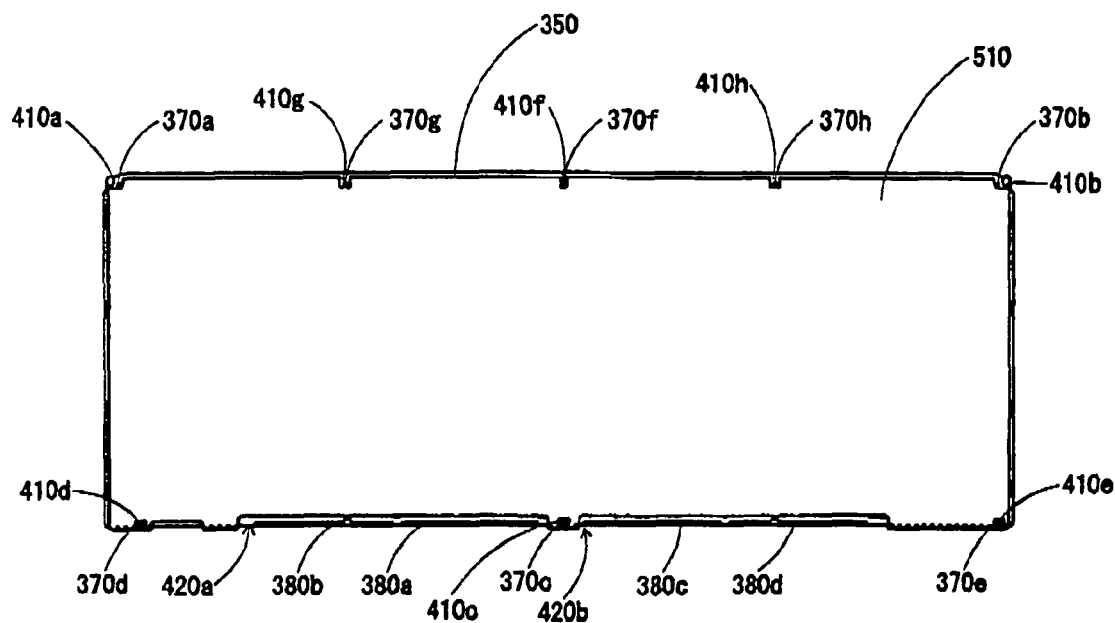
FIG. 48 is a front view showing a state where optical sheets 400, 500 and 510 are stacked on the light guide 350.

Next, a light guide 350 and optical sheets (diffusing sheet 400, vertical eye prism sheet 500 and horizontal eye prism sheet 510), which are a modification of the light guide and the optical sheets used in the present invention, will be described. FIG. 46 is a front view of the light guide 350, FIG. 47 is a front view of the diffusing sheet 400, and FIG. 48 is a front view showing a state where optical sheets 400, 500 and 510 are stacked on the light guide 350.

The light guide 350 has substantially the same shape as the light guide 30 and, as shown in FIG. 46, in the upper end of the front side 320, pins (small projections) are respectively formed at positions of left and right edges (first pin 370a and second pin 370b), the center (sixth pin 370f, a middle between the first pin 370a and the sixth pin 370f (seventh pin 370g) and a middle between the second pin 370b and the sixth pin 370f (eighth pin 370h). On the other hand, left and right edges (fourth pin 370d and fifth pin 370e) and the center (third pin 370c) are provided in the lower end of the front side of the light guide 350. In addition, a first rib 380a and a second rib 380b along the lower end of the light guide 350 are provided between the fourth pin 370d and the third pin 370c, and a third rib 380c and a fourth rib 380d along the lower end of the light guide 350 are provided between the fifth pin 370e and the third pin 370c.

The diffusing sheet 400, the vertical eye prism sheet 500 and the horizontal eye prism sheet 510 are stacked in order in the front side of the light guide 350. The optical sheets 400, 500 and 510 have the same material as the above-described optical sheets 40, 50 and 51. These optical sheets 400, 500 and 510 have holes or cut-out portions formed at positions corresponding to the pins 370a to 370h and the ribs 380a to 380d in the same aspect. The optical sheets 400, 500 and 510 are stacked in order in the front side of the light guide 300 such that the pins 370a to 370h and the ribs 380a to 380d are positioned in the corresponding holes or cut-out portions.

A detailed configuration of the holes will be described by way of an example of the diffusing sheet 400 with reference to FIG. 47. As shown in FIG. 47, five cut-out portions 410a, 410g, 410f, 410h and 410b are formed in the upper end of the diffusing sheet 400 in order from the left side of the paper. On the other hand, a hole 410d is formed in a corner of the left side of the paper of the lower end, a hole 410e is formed in a corner of the right side of the paper of the lower end, and a hole 410c is formed in the center of the lower end. In addition, a cut-out portion 420a is formed between the hole 410d and the hole 410c, and a cut-out portion 420b is formed between the hole 410e and the hole 410c. All of the holes 410d, 410c and 410e in the lower end have 3 functions, that is, positioning and maintenance of the diffusing sheet 400 with respect to the light guide 350, tracking to positional change of a horizontal direction in company with expansion and contraction of the light guide 350 and the diffusing sheet 400 (adjustment of position of the horizontal direction), and prevention of positional deviation of a vertical direction. All of the holes 410d, 410e and 410c are made to be long in the horizontal direction in order to show these functions. Specifically, the diameter of the holes is about 1.5 mm in the vertical direction and about 3.0 mm in the horizontal direction. On the other hand, a cut-out portion 410f at a center position of the upper end has 3 functions, that is, positioning and maintenance of the diffusing sheet 400 with respect to the light guide 350, tracking to positional change of a vertical direction in company with expansion and contraction of the light guide 350 and the diffusing sheet 400 (adjustment of position of the vertical direction), and prevention of positional deviation of a horizontal direction. The cut-out portion 410f is made to be long in the vertical direction in order to show these functions. Specifically, the cut-out portion has a shape which is about 1.5 mm in the horizontal direction (width) and is dug by about 4.5 mm from the bottom side in the vertical direction.

The cut-out portions 410a and 410b formed in the left and right edges of the upper end are used for support of the diffusing sheet 400. That is, the provision of these cut-out portions ensure that the left and right edges of the upper end of the diffusing sheet 400 is arranged at a desired position when the diffusing sheet 400 is placed on the light guide. In addition, when the light guide 350 and the diffusing sheet 400 are expanded/contracted, it is possible to prevent the left and right edges of the upper end of the diffusing sheet 400 from interfering with other adjacent members. In addition, the cut-out portions 410a and 410b have a rectangular shape which is about 5.0 mm in width and about 4.5 mm in height so as to track to positional change of a horizontal direction and a vertical direction in company with the expansion and contraction of the light guide 350 and the diffusing sheet 400. On the other hand, the cut-out portion 420a and the cut-out portion 420b are a rectangular long dug groove which is about 100 mm in width and about 4.5 mm in height, and are formed bisymmetrically on the basis of the hole 410c.

As shown in FIG. 48, by inserting the corresponding pins 370a, 370g, 370f, 370h, 370b, 370d, 370c and 370e into the cut-out portions 410a, 410g, 410f, 410h and 410b and the holes 410d, 410c and 410e, respectively, the diffusing sheet 400 is positioned and maintained on the light guide 350. It can be seen that the holes 410d, 410c and 410e are positioned such that the corresponding pins are positioned at the substantial middle. In addition, as shown in FIG. 48, the ribs 380a to 380d of the lower end of the light guide 350 are positioned at the cut-out portions 420a and 420b. That is, the cut-out portions 420a and 420b function as a region from which the ribs 380a to 380d exit, thereby preventing the diffusing sheet 400 from interfering with the ribs 380a to 380d unnecessarily.

The size of the cut-out portions 410a, 410g, 410f, 410h and 410b and the holes 410c, 410d and 410e is set in consideration of the size of the pins 370a, 370g, 370f, 370h, 370b and 370c, thermal coefficients of the light guide 350 and the diffusing sheet 400 of the ribs 380a to 380d, etc., and is shown as only an example in the second embodiment. As an example of the size of the holes and cut-out portions, the cut-out portions 410a, 410g, 410f, 410h and 410b have a size to secure a clearance of, for example, 0 mm to 0.45 mm, preferably 0 mm to 0.2 mm in the vertical direction and a clearance of, for example, 0.4 mm to 1.03 mm, preferably 0.8 mm to 1.03 mm in the horizontal direction when the pins are inserted. The cut-out portion 410c has a size to secure a clearance of, for example, 0.28 mm to 1.08 mm, preferably 0.85 mm to 1.08 mm in the vertical direction and a clearance of, for example, 0 mm to 0.45 mm, preferably 0 mm to 0.2 mm in the horizontal direction when the pins are inserted. The cut-out portion 420a has a size to secure a clearance of, for example, 1.0 mm to 5.0 mm, preferably 0.5 mm to 1.5 mm in the upper side of the ribs 380a and 380b and a clearance of, for example, 1.0 mm to 5.0 mm, preferably 0.5 mm to 1.5 mm in the horizontal direction.

The number and formation position of the holes depend on the number and formation position of the pins formed in the light guide, but those shown in FIGS. 47 and 48 are shown as only an example. For example, one or more holes (holes for positioning and maintenance, tracking to positional change of a horizontal direction, and prevention of positional deviation of a vertical direction) showing the same functions as the above-mentioned holes may be provided between the cut-out portion 410a and the cut-out portion 410g, between the cut-out portion 410g and the cut-out portion 410f, between the cut-out portion 410f and the cut-out portion 410h, and between the cut-out portion 410h and the cut-out portion 410b, respectively.

Figure 49:
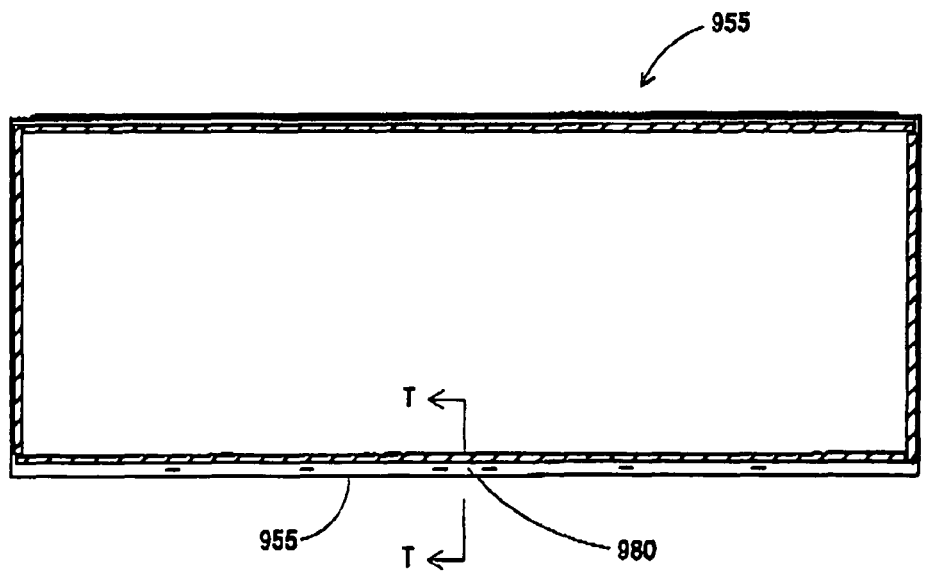
FIG. 49 is a front view of a TFT holder 950.
Figure 50:
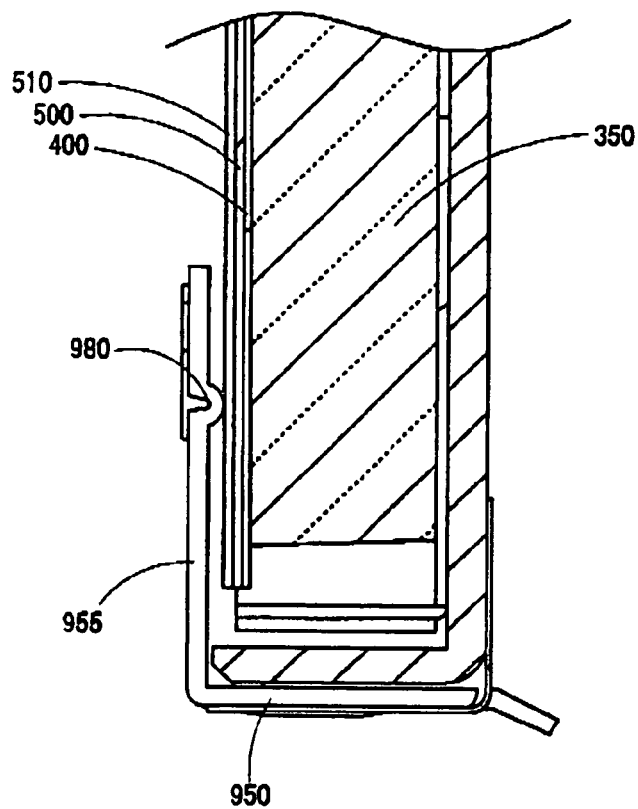
FIG. 50 is a sectional view taken along line T-T in FIG. 49 in a state where the optical sheets 400, 500 and 510 are placed on the light guide 350 and the TFT holder 950 is mounted on the light guide 350.

The optical sheets 400, 500 and 510 are maintained by the light guide 350 and a TFT holder 950. FIG. 49 is a front view of the TFT holder 950. As shown in FIG. 49, the TFT holder 950 has the same shape as the TFT holder 90 except that the first projection 98 is not provided. The TFT holder 950 has a first projection 980 in the center of a lower edge 955 of the TFT holder 950, instead of the first projection 98. The first projection 980 is a semispherical projection which projects toward the optical sheet 400, and is about 1.0 mm in diameter and about 0.36 mm in height. FIG. 50 is a sectional view taken along line T-T in FIG. 49, showing a state where the optical sheets 400, 500 and 510 are placed on the light guide 350 and the TFT holder 950 is mounted on the light guide 350. As shown in FIG. 50, the first projection 980 of the light guide 350 contacts the horizontal eye prism sheet 510 and the optical sheets 400, 500 and 510 are pressed against the light guide 350 side. Thus, the optical sheets 400, 500 and 510 are held and fixed by the TFT holder 950 and the light guide 350 in that the first projection 980 contacts the horizontal eye prism sheet 510. This shows the same effect as the backlight unit 1. In addition, the fixation positions of the optical sheets 400, 500 and 510 are positioned in the lower edge of the TFT holder 950, and on the other hand, a light source is provided in the upper edge of the TFT holder 950. Thus, since the optical sheets 400, 500 and 510 are positioned and fixed at a position far away from the light source that generates heat, thermal expansion of the light guide 350 and the optical sheets 400, 500 and 510 is hard to occur at the fixation position. As a result, position deviation of the light guide 350 and the optical sheets 400, 500 and 510 is further prevented.

Figure 51:
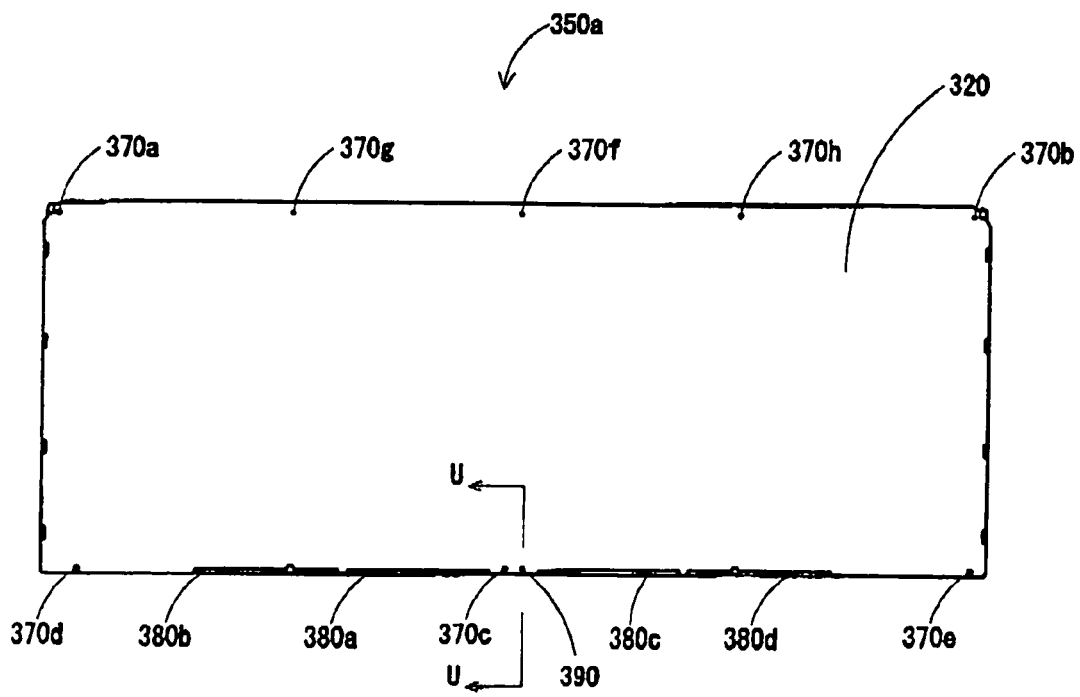
FIG. 51 is a front view of a light guide 350*a*.
Figure 52:
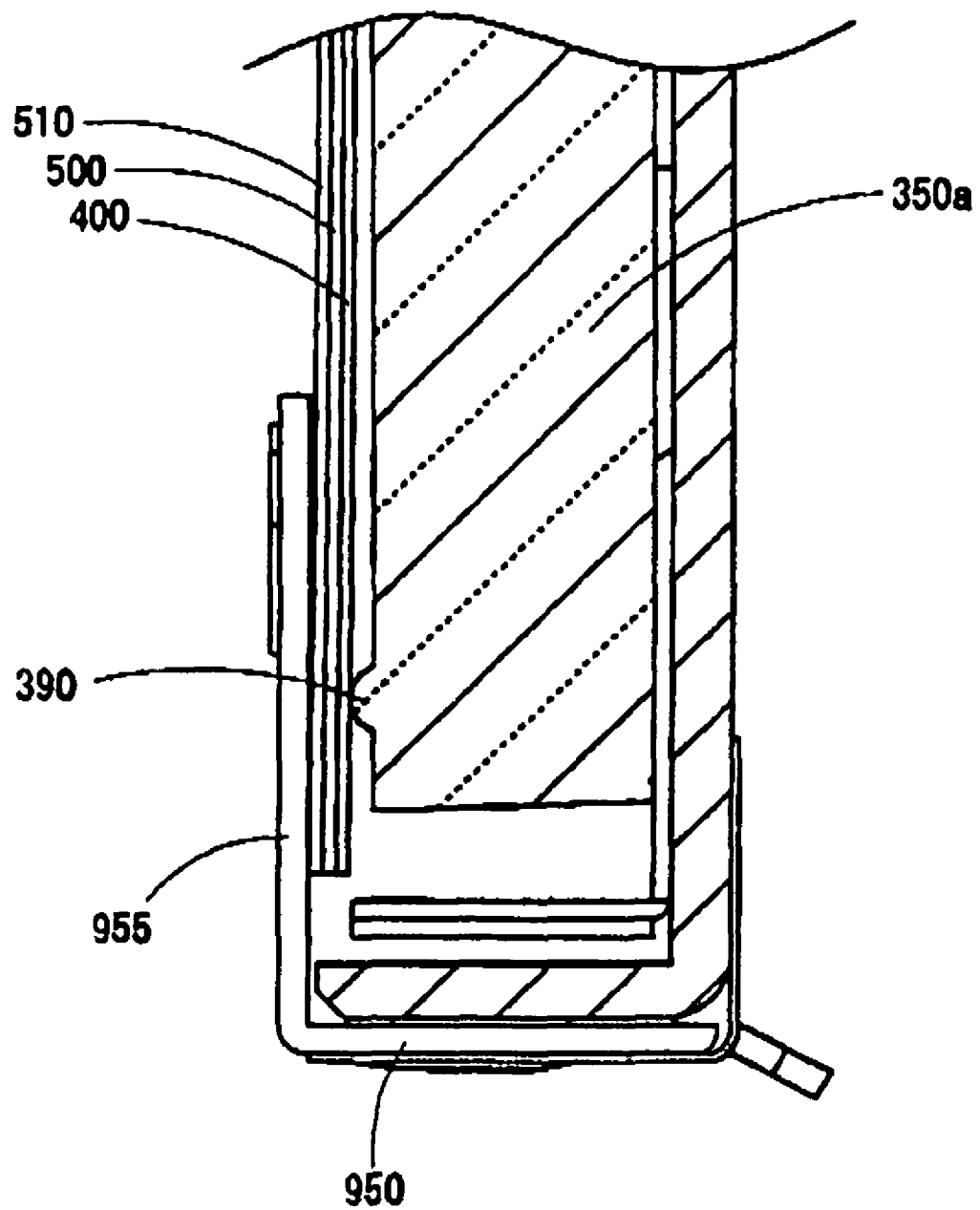
FIG. 52 is a sectional view taken along line U-U in FIG. 51 in a state where the optical sheets 400, 500 and 510 are placed on the light guide 350 and the TFT holder 950 is mounted on the light guide 350.

FIG. 51 is a front view of a light guide 350a which is a modification. The same members as the above-described embodiments are denoted by the same reference numerals, and explanation of which will be omitted. The light guide 350a has a second projection 390 at a position distant by about 2.0 mm from the pin 370c of the center of the top edge in the right direction of the paper. The second projection 390 is a semispherical projection which projects toward the optical sheets, and is about 1.0 mm in diameter and about 0.38 mm in height. Like the backlight unit 1, the optical sheets 400, 500 and 510 are placed on the light guide 350a and the TFT holder 900 is mounted thereon. FIG. 52 is a sectional view taken along line U-U in FIG. 51 in a state where the optical sheets 400, 500 and 510 are placed on the light guide 350a and the TFT holder 900 is mounted thereon. As shown in FIG. 52, the second projection 390 of the light guide 350a contacts the diffusing sheet 400 and the optical sheets 400, 500 and 510 are pressed against the TFT holder 900 side. Thus, the optical sheets 400, 500 and 510 are held and fixed by the TFT holder 900 and the light guide 350a in that the second projection 390 contacts the optical sheet 400. This shows the same effect as the backlight unit 1. In addition, since the optical sheets 400, 500 and 510 are positioned and fixed at a position far away from a light source that generates heat, thermal expansion of the light guide 350a and the optical sheets 400, 500 and 510 is hard to occur at the fixation position, and as a result, position deviation of the light guide 350a and the optical sheets 400, 500 and 510 is further prevented. In addition, the second projection 390 may be separately provided by small pieces or the like.

The backlight unit of the present invention may be used as a backlight for mobile telephones, portable information terminals, car navigation systems, laptop (notebook) PCs, liquid crystal TVs and so on.

The present invention is not intended to be limited to the aspects and description of the above embodiments. It is to be understood to those skilled in the art that various modifications may made without departing from the spirit and scope of the present invention which are set forth in the claims and such modifications are encompassed by the present invention.

What is claimed is:

1. A backlight unit, comprising:
 a support plate;
 a light guide plate, disposed in a front side of the support plate and emitting light that is introduced from a light source through an end side of the light guide plate, through a front side of the light guide plate;
 an optical sheet, disposed in the front side of the light guide plate; and
 a liquid crystal panel maintenance member, disposed in a front side of the optical sheet,
 wherein the optical sheet is fixed only by the light guide plate and the liquid crystal panel maintenance member, and
 wherein at least one of the light guide plate and the liquid crystal panel maintenance member includes a first projection such that a tip of the first projection abuts a face of the optical sheet which faces the at least one of the light guide plate and the liquid crystal panel maintenance member so as to fix a fixed portion of the optical sheet contacting the first projection at the tip of the first projection.

2. The backlight unit according to claim 1, wherein the liquid crystal panel maintenance member includes the first projection that projects toward the light guide plate, and the optical sheet is held and fixed at one point by the first projection and the light guide plate.

3. The backlight unit according to claim 2, wherein the first projection is formed in a center of an upper edge of the liquid crystal panel maintenance member.

4. The backlight unit according to claim 2, wherein the first projection is formed in a center of a lower edge of the liquid crystal panel maintenance member.

5. The backlight unit according to claim 1, wherein the light guide plate includes a second projection that projects toward the liquid crystal panel maintenance member, and the optical sheet is held and fixed at one point by the second projection and the liquid crystal panel maintenance member.

6. The backlight unit according to claim 5, wherein the second projection is formed in a center of an upper edge of the light guide plate.

7. The backlight unit according to claim 5, wherein the second projection is formed in a center of a lower edge of the light guide plate.

8. The backlight unit according to claim 5, wherein the optical sheet is sandwiched between a tip of the second projection and the tip of the first projection.

9. The backlight unit according to claim 5, wherein the second projection is disposed opposite the first projection.

10. The backlight unit according to claim 1, wherein the light guide plate and the liquid crystal panel maintenance member hold and fix the optical sheet at one point via a fixing member provided between the light guide plate and the optical sheet or between the liquid crystal panel maintenance member and the optical sheet.

11. The backlight unit according to claim 1, wherein the light guide plate and the liquid crystal panel maintenance member hold and fix the optical sheet without forming a through hole in the optical sheet at the fixed portion of the optical sheet.

12. The backlight unit according to claim 1, wherein a distal end face of the first projection abuts an outer surface of the optical sheet which faces the at least one of the light guide plate and liquid crystal panel maintenance member so as to hold and fix the optical sheet.

13. The backlight unit according to claim 1, wherein a combination of the first projection and the fixed portion of the optical sheet is configured such that a remainder of the optical sheet moves relative to the fixed portion of the optical sheet when the optical sheet expands or contracts.

14. The backlight unit according to claim 1, wherein the optical sheet is only fixed in relation to the light guide plate and the liquid crystal panel maintenance member at the fixed portion of the optical sheet contacting the first projection.

15. The backlight unit according to claim 1, wherein the optical sheet includes a cut-out portion, and
 wherein the light guide plate includes a rib portion corresponding to the cut-out portion, so as to secure a gap between the light guide plate and the liquid crystal panel maintenance member.

16. The backlight unit according to claim 1, wherein the optical sheet includes a first small cut-out portion,
 wherein the at least one of the light guide plate and the liquid crystal panel maintenance member includes a first small projection formed at substantially a same vertical position as the fixed portion of the optical sheet, and
 wherein the first small cut-out portion has a length in a horizontal direction greater than a length in the horizontal direction of the first small projection, and the first small cut-out portion has a position corresponding to a position of the first small projection.

17. The backlight unit according to claim 16, wherein the first small cut-out portion is disposed in a left edge of a front upper end of the optical sheet.

18. The backlight unit according to claim 17, wherein the optical sheet includes a second small cut-out portion,
 wherein the at least one of the light guide plate and the liquid crystal panel maintenance member includes a second small projection formed at substantially a same vertical position as the fixed portion of the optical sheet, and
 wherein the second small cut-out portion has a length in the horizontal direction greater than a length in the horizontal direction of the second small projection, and the second small cut-out portion has a position corresponding to a position of the second small projection and is disposed in a right edge of the front upper end of the optical sheet.

19. The backlight unit according to claim 18, wherein the optical sheet includes a third small cut-out portion, wherein the at least one of the light guide plate and the liquid crystal panel maintenance member includes a third small projection formed at substantially a same horizontal position as the fixed portion of the optical sheet, and wherein the third small cut-out portion has a length in a vertical direction greater than a length in the vertical direction of the third small projection, and the third small cut-out portion has a position corresponding to a position of the third small projection and is disposed in a lower end of the optical sheet.

* * * * *